(12) United States Patent
Okada et al.

(10) Patent No.: US 8,054,437 B2
(45) Date of Patent: Nov. 8, 2011

(54) LARGE SUBSTRATE, METHOD OF MANUFACTURING LIQUID CRYSTAL DEVICE FROM THE SAME, AND LIQUID CRYSTAL DEVICE OBTAINED

(75) Inventors: Kazuhiro Okada, Fujimino (JP); Katsuyuki Tanaka, Tokorozawa (JP); Hiroshi Tsukada, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 344 days.

(21) Appl. No.: 12/225,768

(22) PCT Filed: Mar. 19, 2007

(86) PCT No.: PCT/JP2007/055461
§ 371 (c)(1),
(2), (4) Date: Sep. 29, 2008

(87) PCT Pub. No.: WO2007/119409
PCT Pub. Date: Oct. 25, 2007

(65) Prior Publication Data
US 2009/0231516 A1 Sep. 17, 2009

(30) Foreign Application Priority Data
Mar. 31, 2006 (JP) .................................. 2006-096491
Jan. 9, 2007 (JP) .................................. 2007-001238

(51) Int. Cl.
*G02F 1/1339* (2006.01)
(52) U.S. Cl. ........................................ 349/153; 349/190

(58) Field of Classification Search .................. None
See application file for complete search history.

(56) References Cited

U.S. PATENT DOCUMENTS
6,275,277 B1 * 8/2001 Walker et al. .................. 349/113

FOREIGN PATENT DOCUMENTS
| JP | 4-240621 | 8/1992 |
| JP | 6-75233 | 3/1994 |
| JP | 8-313917 | 11/1996 |
| JP | 11-14953 | 1/1999 |
| JP | 2003-149655 A * | 5/2003 |

OTHER PUBLICATIONS

Computer translation of detailed description section of JP 8-313917 A (application publishedNov. 29, 1996).*

* cited by examiner

*Primary Examiner* — Mike Stahl
(74) *Attorney, Agent, or Firm* — Smith, Gambrell & Russell, LLP

(57) ABSTRACT

A plurality of panels (40) are cut from a large substrate (mother substrate) including a lower large substrate (41A) and an upper large substrate (42A). For each panel (40), a frame-shaped seal (47) and a connection electrode forming section (C) are formed in the large substrate. Since the left side (47c) of the frame of a panel (40) is close to the right side (47b) of the frame of the left-adjacent panel, these sides of the seals are formed from a sealing material containing a lower density of spacers. Since the upper side (47a) of the frame of a panel (40) is separated from the lower side (47d) of the frame of the upper adjacent panel (40) by an extension (C') for the connection electrodes, these seal members are formed from a sealing material containing a higher density of spacers.

18 Claims, 21 Drawing Sheets d > d1

PRIOR ART

PRIOR ART

LARGE SUBSTRATE, METHOD OF MANUFACTURING LIQUID CRYSTAL DEVICE FROM THE SAME, AND LIQUID CRYSTAL DEVICE OBTAINED

FIELD OF THE INVENTION

The present invention relates to a large substrate in which a plurality of panels are formed and from which individual panels are cut, a liquid crystal device obtained from the large substrate, and a method of manufacturing the liquid crystal device. More specifically, the present invention relates to a large substrate, a liquid crystal device obtained from the large substrate, and a method of manufacturing the liquid crystal device in which the large substrate is formed by bonding upper and lower large substrates together face to face with a plurality of frame-shaped seals interposed between them to frame individual cells, the large substrate is cut into a plurality of strips each including one row of cells, and an electro-optical conversion member such as a liquid crystal is injected into the cells to form individual panels.

BACKGROUND OF THE INVENTION

Liquid crystal devices are used in various apparatus, including middle- and large-sized apparatus such as desktop personal computers, notebook personal computers, and liquid crystal television sets as well as small mobile apparatus such as electronic organizers, mobile telephones, and digital cameras. Thin and lightweight liquid crystal panels are used in these various types of apparatus.

A liquid crystal device has a panel filled with a liquid crystal as an electro-optical conversion member. The panel is cut from a large substrate in which a plurality of panels are formed.

A technique for forming a plurality of panels in a large substrate, cutting out the individual panels, and injecting a liquid crystal into the panels will now be described with reference to FIGS. 27 and 28.

A lower large substrate 1A and an upper large substrate 2A are provided, on either one of which frame-shaped seals 7 are formed by a technique such as printing. Each frame-shaped seal 7 corresponds to one panel A plurality of frame-shaped seals 7 are arranged in a matrix on the lower large substrate 1A or upper large substrate 2A. Part of each frame-shaped seal is left open and the opening is flanked on both sides by projections 7e projecting outward to form an injection port 7f. The injection port 7f is used to inject the liquid crystal.

The seal 7 is made of a resin adhesive 7m containing gap adjustment members (referred to hereinafter as spacers) 7n for adjusting the gap between the substrates. The spacers 7n set the amount of gap (the gap dimension) between the lower and upper large substrates 1A, 2A. The resin adhesive 7m may be a thermosetting adhesive, UV-curing adhesive, or other adhesive.

Each frame-shaped seal 7 has four sides 7a, 7b, 7c, and 7d, side 7a facing side 7d and side 7b facing side 7c. The injection port 7f is located in side 7a.

After a plurality of frame-shaped seals 7 are formed on the lower large substrate 1A or upper large substrate 2A, the lower and upper large substrates 1A, 2A are placed face to face and aligned with each other in planes parallel to the opposing surfaces of the resultant large substrate. Then, the lower and upper large substrates 1A, 2A are bonded together by heating or ultraviolet irradiation under pressure applied to the lower and upper large substrates 1A, 2A from the outside toward the inside. This bonding step forms a plurality of panels 10-1, 10-2, 10-3, . . . in the lower and upper large substrates 1A, 2A as shown in FIG. 27.

When the lower and upper large substrates 1A, 2A are bonded together, injection regions B, into which the liquid crystal is injected as the electro-optical conversion member in a subsequent step, are created inside the individual seals 7 as shown in FIG. 28.

A plurality of transparent electrodes 3 are provided for each of the panels on the surface of the lower large substrate 1A facing the upper large substrate 2A as shown in FIG. 28, and oriented films 5 are provided on the transparent electrodes 3. Similarly, a plurality of transparent electrodes 4 and oriented films 6 are provided on the surface of the upper large substrate 2A facing the lower large substrate 1A.

Each liquid crystal panel includes a liquid crystal section containing a liquid crystal sealed in the space enclosed by the frame-shaped seal and a connection electrode forming section C outside the frame-shaped seal. Connection electrodes (or wiring electrodes) disposed in the connection electrode forming section C establish electrical connections with electrodes (mainly, pixel electrodes and wiring electrodes) disposed in the liquid crystal section to transmit signals for driving the liquid crystal.

In FIGS. 27 and 28, the connection electrode forming section C of a panel occupies the space between the frame-shaped seal 7 of the panel and the frame-shaped seal 7 of the vertically adjacent panel. The connection electrode forming section C is formed on an extension C' of the lower large substrate 1A.

As shown in FIG. 28, the connection electrode forming section C is formed only on the lower large substrate 1A. Connection electrodes 9 are disposed on the connection electrode forming section C. The connection electrodes 9 include lead wiring electrodes (or wiring electrodes) for connection to the transparent electrodes 3 in the electro-optical conversion member injection region B on the lower large substrate 1A, and for connection through a transfer-connection structure to the transparent electrodes 4 on the upper large substrate 2A.

The dot-dash lines X1, X2, X3, and Y in FIG. 27 are cleaving or cutting lines for separating the panels 10-1, 10-2, 10-3, 10-4, 10-11, . . . , 10-21, . . . from the large substrate (mother substrate) composed of the lower and upper large substrates 1A, 2A. Individual panels are obtained by cutting along these cutting lines. (An arbitrary one of the panels will be referred to hereinafter as "panel 10".)

First, the lower and upper large substrates 1A, 2A are cut simultaneously into strips along cutting lines X3, each strip including a row of panels 10. Next, each strip is cut along cutting line X1 to remove a region K to trim the projecting tips of the projections 7e on both sides of the injection ports 7f in the seals 7. Then, the upper substrate 2A is cut along cutting line X2 as shown in FIG. 28 to remove an unnecessary portion D.

After the strips have been formed by these cuts, a liquid crystal is injected as an electro-optical conversion member into the individual panels through their injection ports 7f. Then, the injection ports 7f are sealed. Next, each strip is cut along cutting lines Y to obtain individual panels with the liquid crystal encapsulated therein, i.e., individual liquid crystal panels (liquid crystal devices).

The above manufacturing method allows a plurality of liquid crystal panels to be cut out and formed from a large substrate. A drawback has been found in this manufacturing method, however: the gap between the upper and lower substrates of each panel is not uniform over the entire panel, varying in different portions of the panel. The inventors have found a new tendency in this gap irregularity.

The plan view in FIG. 29 illustrates this problem of the above manufacturing method.

Among the sides 7a, 7b, 7c, and 7d of the frame-shaped seal 7 of a panel 10, the gap tends to be narrower in the diagonally shaded areas E1, E2 on sides 7a and 7d than in other areas.

This problem is caused by a difference in the distance between seals: the distances between side 7a of the seal of a panel 10 and side 7d of the seal of an adjacent panel 10, and between the side 7d of the seal of a panel 10 and side 7a of the seal of an adjacent panel 10 are enlarged by the connection electrode forming section C and projecting tip clipping area K between the seal members 7a, 7d of the panel 10 and the seal members 7d, 7a of the adjacent panels 10.

With reference to the large substrate in FIG. 27, the distance between sides 7a and 7d of adjacent seals is lengthened by the connection electrode forming section C and projecting tip clipping area K between side 7a of the seal in panel 10-13 and side 7d of the seal in the upper adjacent panel 10-3. Similarly, the distance between sides 7d and 7a is lengthened by the connection electrode forming section C and projecting tip clipping area K between side 7d of the seal in panel 10-13 and side 7a of the seal in the lower adjacent panel 10-23.

In comparison, side 7b of the seal in panel 10-13 is close to side 7c of the seal in the right-adjacent panel 10-14, and side 7c of the seal in panel 10-13 is also close to side 7b of the seal in the left-adjacent panel 10-14.

If the seals disposed between the lower and upper large substrates are closely spaced in some parts and more widely spaced in other parts, the more widely spaced parts of the seals tend to experience a larger thickness deformation than the closely spaced parts when external pressure is applied to bond the lower and upper large substrates together. In short, the inventors have found that the seal thickness varies in different parts of a single panel.

If such a panel, with different thickness deformations in different seal areas (causing the gap between the lower and upper large substrates to vary significantly in different panel areas), is employed in a liquid crystal display device, uneven color and other problems degrading the color image quality or display quality will appear on the display.

Although various attempts have been made to minimize the gap irregularities of large substrates, the problem found above by the inventors have not been successfully addressed in the art.

In the art described in Japanese Unexamined Patent Application Publication No. 6-75233 and illustrated in FIG. 30, for example, the distance between the centers of the lower and upper large substrates is mechanically adjusted by suction applied by a cell suctioning pump or pressure applied by a cell pressurizing compressor. FIG. 30 is a plan view showing the pattern in which the seals are disposed; each frame-shaped seal member 301 has a liquid crystal injection port 304 and is surrounded by dummy seal members 303 to balance the pressure applied to the seal material in the step of applying pressure to the substrates. No spacers are mixed into these seal members.

Japanese Unexamined Patent Application Publication No. 11-14953 discloses a technique for securing a uniform cell gap for each liquid crystal panel cut from a large substrate by surrounding each frame-shaped seal formed in the large substrate by dummy seals disposed parallel to the sides of the seal.

Japanese Unexamined Patent Application Publication No. 4-240621 discloses a technique for securing a uniform gap over the entire area of a liquid crystal panel composed of two substrates and providing a uniform thickness in the liquid crystal layer by placing the same number of spacers in the long sides of a rectangular frame-shaped seal as in the short sides.

Furthermore, a typical liquid crystal display panel has a pair of transparent substrates placed face to face, each equipped with transparent electrodes, an oriented film, and other elements, with a frame-shaped seal (encapsulating member) containing gap adjustment members (spacers) disposed in the peripheral parts between the opposite surfaces. A liquid crystal is injected as an electro-optical conversion member into the space surrounded by the seal between the opposite substrates.

A seal for a liquid crystal device will now be described with reference to FIGS. 31-35.

A liquid crystal panel 101 is composed of a lower substrate 110 and an upper substrate 120 placed face to face with a gap between them. The lower substrate 110, as shown in FIGS. 32 and 33, has a transparent substrate 111 as a base member, with transparent electrodes 112 formed by patterning on the surface of the transparent substrate 111 facing the upper substrate 120. An insulating film 113 is formed on the upper surface of the transparent electrodes 112 to prevent the transparent electrodes 112 from being short-circuited to the electrodes on the upper substrate 120 by dust or other foreign particles. The lower substrate 110 also has an oriented film 114 formed on the upper surface of the insulating film 113. When the liquid crystal panel 101 is used as a reflective liquid crystal panel, the lower substrate 110 may be opaque or semitransparent, and for an active panel TFT or MIM (TFD) elements or the like may be formed on the substrate.

The upper substrate 120 has a transparent substrate 121 as a base member, similar to the lower substrate 110, and has a color filter 122 with red (R), green (G), and blue (B) color filters arranged in a striped or matrix pattern on the surface of the transparent substrate 121 facing the lower substrate 110. As shown in FIGS. 32 and 33, a flattening film, protection film, or overcoat 123 is disposed on the lower surface of the color filter 122 to protect the color filter 122 and flatten its surface. The overcoat 123 has transparent electrodes 124 formed by patterning on its lower surface. The upper substrate 120 also has an oriented film 125 formed on the lower surface of the transparent electrodes 124.

A frame-shaped seal 130 is disposed between the lower and upper substrates 110, 120 of the liquid crystal panel 101. Spacers 131 are intermixed with the seal 130. The lower and upper substrates 110, 120 are bonded together through the seal 130.

The spacers 131 serve to maintain a uniform gap (cell gap) between the lower and upper substrates 110, 120. More specifically, the lower and upper substrates 110, 120 are positioned with a predetermined gap therebetween by the spacers 131. The region surrounded by the frame-shaped seal 130 is the space into which the liquid crystal injected. The liquid crystal 140 is injected into this space through the injection port 132 shown in FIG. 31. After a predetermined amount of liquid crystal is injected, the injection port 132 is sealed with port sealing resin 133. In this manner, the liquid crystal layer 140 shown in FIGS. 32 and 33 is formed. Intra-cell spacers 141 are scattered throughout the liquid crystal layer 140 to keep the gap (cell gap) between the substrates uniform.

A liquid crystal panel 101 having the above structure is obtained by cutting a large liquid crystal cell 501, shown as a large substrate (mother substrate) in FIG. 34, on which a plurality of liquid crystal panels are created at once, then injecting a liquid crystal into each liquid crystal cell, and sealing each injection port. The upper and lower substrates constituting the large liquid crystal cell 501 are first cut simultaneously along the cutting lines marked X-X1. Then, the upper substrate is cut along cutting lines X2-X3 to obtain strips each including a plurality of liquid crystal cells arranged in a row.

A liquid crystal is injected through the respective injection ports of the individual liquid crystal cells in the strips; then the injection ports are sealed, and the upper and lower substrates including the liquid crystal cells are cut simultaneously along cutting lines Y-Y1 in FIG. 34 to produce individual liquid crystal panels.

The large liquid crystal cell 501 shown as the mother substrate in FIG. 34 is formed by overlaying the upper large substrate 520 shown in FIG. 35(B) face to face on the lower large substrate 510 shown in FIG. 35(A). Seals 130 arranged as a plurality of rectangular frames are formed on the lower large substrate 510. No seals 130 are formed on the upper large substrate 52.

The transparent electrodes 112, insulating films 113, and oriented films 114 shown in FIGS. 32 and 33 (not shown in FIG. 35(A)) are disposed on the surface 510F of the lower large substrate 510 facing the upper large substrate 520 in FIG. 35(A). A plurality of frame-shaped seals 130 are also disposed as described above on the lower large substrate 510.

The color filters 122, overcoats 123, transparent electrodes 124, and oriented films 125 shown in FIGS. 32 and 33 (not shown in FIG. 35(B)) are disposed on the surface 520F of the upper large substrate 520 facing the lower large substrate 510 in FIG. 35(B).

A liquid crystal panel 101 produced from this large liquid crystal cell 501 has the following problems.

As shown in FIG. 31, an extension 110A of the lower substrate 110 protrudes beyond the associated end of the upper substrate 120. The side 130A of the seal adjacent to the extension 110A of the lower substrate 110 and the opposite side 130A (provided with the injection port 132) contain spacers 131 having a particle size of approximately 6.0 μm. Accordingly, the thickness of these sides 130A of the seal, corresponding to the gap between the opposite substrates, is on the average approximately 6 μm, this gap being defined by the particle size of the spacers 131.

The sides 130B of the seal that meet sides 130A at right angles contain spacers of the same size and material as those above, so the thickness of these sides 130B, corresponding to the gap between the opposite substrates, is also approximately 6 μm, defined by the particle size of the spacers 131.

The inventors have found that the luminance observed near sides 130A of the seal is different from the luminance observed near sides 130B when the completed liquid crystal panel is illuminated by a backlight. Through investigation, the inventors have found that this problem is caused by a difference in flattening between the spacers 131 in sides 130A and the spacers 131 in the sides 130B perpendicular to sides 130A. This will be described below with reference to the cross-sectional views of a representative side 130A in FIG. 32 and a representative side 130B in FIG. 33.

FIGS. 32 and 33 show the degrees of flattening of the spacers 131 in the sides 130A and 130B of the seals. The flattening of the spacers 131 in the side 130A of the seal shown (with some exaggeration) in FIG. 32, is significantly greater than the flattening of the spacers 131 in the side 130B of the seal shown in FIG. 33. More specifically, the spacers 131 in FIG. 32 are flattened enough to reduce the gap between the opposite substrates to approximately 5.5 μm, while the spacers 131 in FIG. 33 are flattened less and the gap between the opposite substrates remains approximately 6.0 μm.

It has been found that this gap difference of approximately 0.5 μm between sides 130A and 130B of the seal, which are disposed in different locations in the panel, causes luminance unevenness M in the peripheral parts around the display area Z (the effective panel area) of the liquid crystal panel 101 shown in FIG. 31 and thereby degrades the display quality.

Accordingly, the inventors examined how the positional difference of the sides of the seal causes such luminance unevenness near the seal in the panel.

Through investigation of the gap between the upper and lower substrates of a liquid crystal panel 101 obtained from a large liquid crystal cell 501 as shown in FIG. 34, it has been found that the gap S2 (FIG. 32) appears in areas corresponding to sides 130A of the seals in FIG. 35(A) and the gap S3 (FIG. 33) appears in areas corresponding to sides 130B of the seals in FIG. 35(A).

This is because in the large liquid crystal cell 501, mutually adjacent sides 130A of the seals are relatively distant from each other because of the extension 110A interposed between them, while mutually adjacent sides 130B of the seals are relatively close together because there is no extension 110A between them.

More specifically, the narrowly spaced sides 130B of the seals (spaced close together) are thought to be more resistant to the external pressure applied when the large liquid crystal cell 501 is manufactured and to be able prevent the spacers 131 in the seal from being significantly flattened. In contrast, the more widely spaced sides 130A of the seals are thought to be less resistant to the pressure applied when the large liquid crystal cell 501 is manufactured; the individual spacers 131 in sides 130A of the seals are subject to more pressure and suffer more flattening.

A difference is accordingly inferred to occur between the gaps S2 and S3 between the upper and lower substrates at sides 130A and 130B of the seal (after the seal is deformed).

SUMMARY OF THE INVENTION

An object of the present invention is to arrange seals containing gap adjustment members, which are disposed between upper and lower substrates constituting a large substrate (mother substrate), so as to make the gap between the upper and lower substrates uniform over the entire area of the large substrate.

To achieve the above object, according to a first aspect of method of manufacturing liquid crystal panels of the present invention, first and second substrates are bonded together with frame-shaped seals interposed therebetween to form regions corresponding to a plurality of panels, a liquid crystal is then encapsulated inside the seals, and the first and second substrates are cut to obtain individual liquid crystal panels. In this method of manufacturing, if a side of the frame formed by the seal in one panel is close to a side of the frame formed by the seal in an adjacent panel when the first and second substrates are placed face to face, these sides are formed from a sealing material containing a relatively low proportion of gap adjustment members. Conversely, if a side of the frame formed by the seal in one panel is distant from a side of the frame formed by the seal in an adjacent panel so that these two seals are widely spaced, these sides are formed from a sealing material containing a relatively high proportion of gap adjustment members.

Dummy seals may be provided outside the seals closest to the peripheral parts of the first and/or second substrate, the distance between these seals and the dummy seals being equal to the distance between adjacent seals in other areas.

The gap adjustment members may be spherical, cylindrical, or prismatic.

The first or second substrate may have extensions extending outwardly from the seal frames to accommodate connection electrodes, and the two sides of the seals adjacently bounding each extension may be formed from a sealing material containing a relatively high proportion of gap adjustment members.

According to a second aspect of method of manufacturing liquid crystal panels of the present invention, first and second substrates are bonded together face to face with frame-shaped seals containing gap adjustment members interposed between them to form regions corresponding to a plurality of panels, a liquid crystal is then encapsulated inside the seals, and the first and second substrates are cut to obtain individual liquid crystal panels. In this method of manufacturing, the gap adjustment members are spherical or cylindrical, and if a side of the frame formed by the seal in one panel is close to a side of the frame formed by the seal in an adjacent panel when said first and second substrates are placed face to face, these sides are formed from a sealing material containing gap adjustment members having a relatively small diameter. If a side of the frame formed by the seal in one panel is distant from a side of the frame formed by the seal in an adjacent panel, these sides are formed from a sealing material containing gap adjustment members having a relatively large diameter. The sides containing gap adjustment members having a relatively small diameter are formed on the first substrate, and the sides containing gap adjustment members having a relatively large diameter are formed on the second substrate so that the seal members form a frame when the first and second substrates are bonded face to face.

The first or second substrate may have extensions extending outward from one frame formed by the seal to accommodate connection electrodes, and the two seal members disposed on both sides of the extension may be formed from a sealing material containing gap adjustment members having a relatively large diameter.

In a method of manufacturing liquid crystal panels according to a third aspect of the present invention, first and second substrates are bonded together face to face with frame-shaped seals containing gap adjustment members interposed therebetween to form regions corresponding to a plurality of panels, a liquid crystal is then encapsulated inside the seals, and the first and second substrates are cut to obtain individual liquid crystal panels. In this method of manufacturing, the gap adjustment members are cylindrical or prismatic. If a side of the frame formed by the seal in one panel is close to a side of the frame formed by the seal in an adjacent panel when the first and second substrates are placed face to face, these sides are formed from a sealing material containing gap adjustment members having a relatively small cross-sectional area in a plane parallel to the surface of the liquid crystal panel. Conversely, if a side of the frame formed by the seal in one panel is distant from a side of the frame formed by the seal in an adjacent panel, these sides are formed from a sealing material containing gap adjustment members having a relatively large cross-sectional area in a plane parallel to the surface of the liquid crystal panel.

The first or second substrate may have extensions extending outward from one frame formed by the seal to accommodate connection electrodes, and the two seal members disposed on both sides of the extension may be formed from a sealing material containing gap adjustment members having a relatively large cross-sectional area.

Dummy seals may be provided outside the seals closest to the peripheral parts of the first and/or second substrate, the distance between these seals and the dummy seals being equal to the distance between adjacent seals in other areas.

According to a first aspect of large substrate of the present invention, regions corresponding to a plurality of panels are formed by bonding first and second substrates face to face with seals interposed therebetween, so that a plurality of panels can be obtained from the large substrate. One seal is formed in a frame shape for each panel to be produced. If a side of the frame formed by the seal in one panel is close to a side of the frame formed by the seal in an adjacent panel and the seals are closely spaced, these sides of the seals are formed from a sealing material containing a relatively low proportion of gap adjustment members. Conversely, if a side of the frame formed by the seal in one panel is distant from a side of the frame formed by the seal in an adjacent panel so that these two seals are widely spaced, these sides of the seals are formed from a sealing material containing a relatively high proportion of gap adjustment members.

The gap adjustment members may be spherical, cylindrical, or prismatic.

The first or second substrate may have extensions extending outward from one frame formed by the seal to accommodate connection electrodes, and the two seal members disposed on both sides of the extension may be formed from a sealing material containing a relatively high proportion of gap adjustment members.

According to a second aspect of large substrate of the present invention, a region corresponding to a plurality of panels is formed by bonding first and second substrates face to face with seals interposed therebetween, so that a plurality of panels can be obtained from the large substrate. One seal is formed in a frame shape for each panel to be produced. If a side of the frame formed by the seal in one panel is close to a side of the frame formed by the seal in an adjacent panel and the seals are narrowly spaced, these sides of the seals are formed from a sealing material containing spherical spacers of relatively small diameter as gap adjustment members. Conversely, if a side of the frame formed by the seal in one panel is distant from a side of the frame formed by the seal in an adjacent panel so that these two seals are widely spaced, these sides of the seals are formed from a sealing material containing spherical spacers of relatively large diameter as gap adjustment members.

The first or second substrate may have extensions extending outward from one frame formed by the seal to accommodate connection electrodes, and the two seal members disposed on both sides of the extension may be formed from the sealing material containing spherical spacers of relatively large diameter.

According to a third aspect of large substrate of the present invention, regions corresponding to a plurality of panels are formed by bonding first and second substrates face to face with seals interposed therebetween, so that a plurality of panels can be obtained from the large substrate. One seal is arranged in a frame shape for each panel to be produced. If a side of the frame formed by the seal in one panel is close to a side of the frame formed by the seal in an adjacent panel so that the seals are narrowly spaced, these sides of the seals are formed from a sealing material containing gap adjustment members having a relatively small cross-sectional area in a plane parallel to the surface of the liquid crystal panel. Conversely, if a side of the frame formed by the seal in one panel is distant from a side of the frame formed by the seal in an adjacent panel so that these two seals are widely spaced, these sides of the seals are formed from a sealing material containing gap adjustment members having a relatively large cross-sectional area in a plane parallel to the surface of the liquid crystal panel.

The first or second substrate may have extensions extending outward from one frame formed by the seal to accommodate connection electrodes, and the two seal members disposed on both sides of the extension may be formed from a sealing material containing gap adjustment members having a relatively large cross-sectional area in a plane parallel to the surface of the liquid crystal panel.

According to a first aspect of liquid crystal panel of the present invention, opposing substrates are bonded face to face with a frame-shaped seal containing gap adjustment members interposed between them, at least one of the opposing substrates has an extension at least at one of its ends, the extension protruding beyond the associated end of the other substrate, and a liquid crystal is encapsulated inside the seal. In this liquid crystal panel, the side of the seal adjacent to the extension contains a higher proportion of gap adjustment members than another side of the seal.

The gap adjustment members may be spherical, cylindrical, or prismatic spacers.

According to a second aspect of liquid crystal panel of the present invention, opposing substrates are bonded face to face with a frame-shaped seal containing gap adjustment members interposed between them, at least one of the opposing substrates has an extension at least at one of its ends, the extension protruding beyond the associated end of the other substrate, and a liquid crystal is encapsulated inside the seal. In this liquid crystal panel, the side of the seal adjacent to the extension contains spherical or cylindrical gap adjustment members having a larger diameter than in another side of the seal.

According to a third aspect of liquid crystal panel of the present invention, opposing substrates are bonded face to face with a frame-shaped seal containing gap adjustment members interposed between them, at least one of the opposing substrates has an extension at least at one of its ends, the extension protruding beyond the associated end of the other substrate, and a liquid crystal is encapsulated inside the seal. In this liquid crystal panel, the side of the seal adjacent to the extension contains cylindrical or prismatic gap adjustment members having a larger cross-sectional area in a plane parallel to the surface of the liquid crystal panel than in another side of the seal.

According to a modified third aspect of liquid crystal panel of the present invention, at least one of the opposite substrates bonded face to face with a frame-shaped seal containing fixed spacers interposed between them has an extension at least at one of its ends, the extension protruding beyond the associated end of the other substrate, a liquid crystal is encapsulated inside the seal, and the side of the seal adjacent to the extension contains a higher density of fixed spacers than another side of the seal.

According to a modified third aspect of liquid crystal panel of the present invention, the density of fixed spacers may be adjusted by adjusting the number of spacers to be disposed per unit area of the seal.

According to a modified third aspect of liquid crystal panel of the present invention, the density of spacers may be adjusted by adjusting the number of spacers to be disposed each having the same cross-sectional area in a plane parallel to the substrate surface after the opposing substrates are bonded together.

According to a modified third aspect of liquid crystal panel of the present invention, the density of spacers may be adjusted by adjusting the number of spacers having different cross-sectional areas in a plane parallel to the substrate surface after the opposing substrates are bonded together.

Alternatively, according to a modified third aspect of liquid crystal panel of the present invention, as the improved version of the third aspect of the present invention, the density of fixed spacers may be adjusted by adjusting an area density which is defined by the total cross-sectional area of the fixed spacers (in a plane parallel to the substrate surface) per unit area in the seal.

In a liquid crystal panel according to a fourth aspect of the present invention, a liquid crystal panel having a liquid crystal layer encapsulating a liquid crystal inside a seal disposed in the gap between two substrates disposed face to face with elastic spacers interposed between them has a first end where an extension extends from one end of one of the two substrates and a second end where the ends of the substrates are mutually aligned. The seal is formed along the edges of one of the two substrates, the spacers are disposed in or near the seal, the spacers form a first spacer structure when disposed near the first end and form a second spacer structure when disposed near the second end, and the first spacer structure is more resistant to external pressure applied to the two substrates than the second spacer structure and prevents the gap from being significantly reduced.

BEST MODE OF PRACTICING THE INVENTION

A first embodiment of the present invention will now be described with reference to FIGS. 1 to 10.

FIRST EXAMPLE

Figure 1:
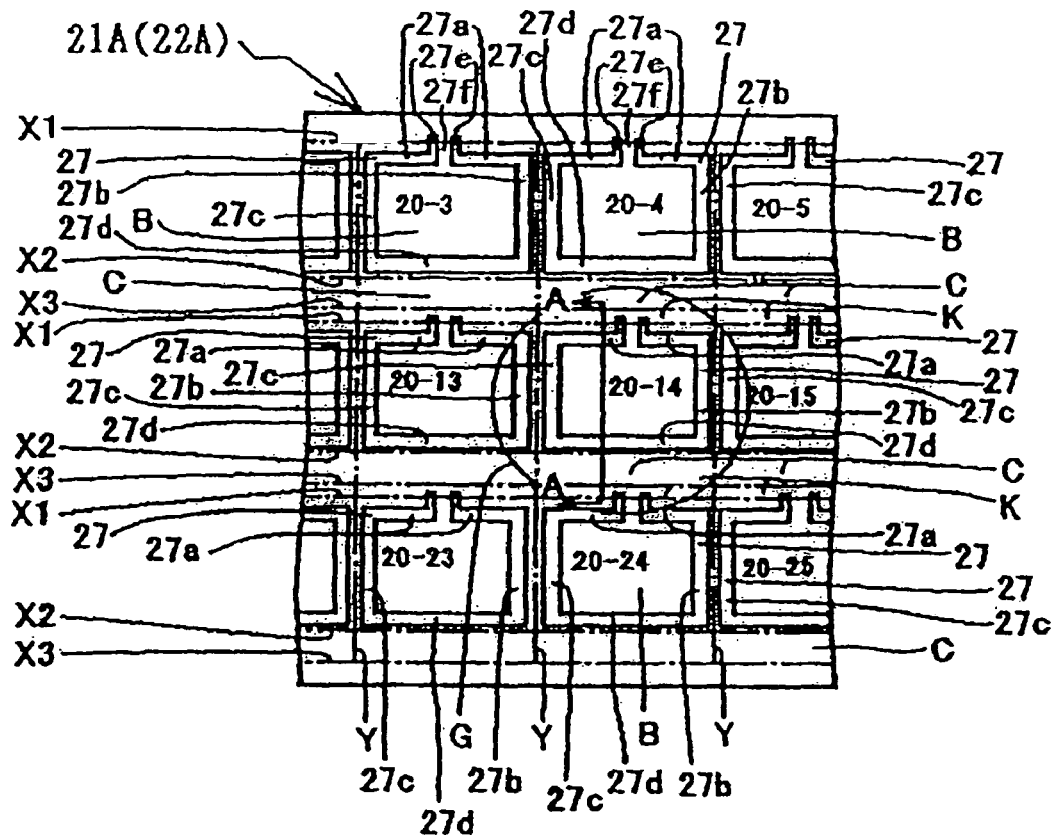
FIG. 1 is a transparent plan view of a plurality of panels formed in a large substrate made of two substrates bonded face to face in a first example according to a first embodiment of the present invention.

FIG. 1 is a transparent plan view showing some of the panels formed on two opposed substrates forming a large substrate, showing how a plurality of liquid crystal panels are obtained from the large substrate.

As shown in FIG. 1, the large substrate includes a plurality of panels (empty panels not filled with an electro-optical conversion member) 20-3, 20-4, 20-5, . . . , 20-13, 20-14, . . . , 20-23, 20-24, . . . arranged in a matrix (an arbitrary one of these panels will be referred to hereinafter as "panel 20").

Figure 2:
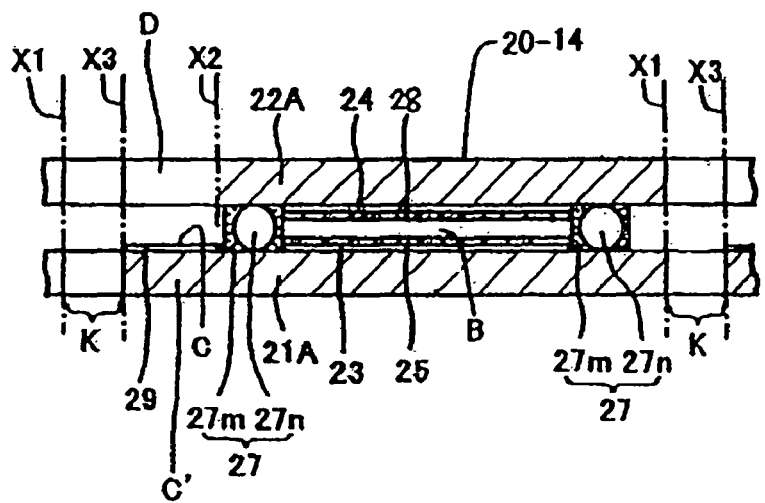
FIG. 2 is a cross-sectional view of the large substrate in FIG. 1 taken along line A-A.

As shown in FIG. 2, the large substrate (mother substrate) shown in FIG. 1 includes two mutually opposed substrates: a lower substrate 21A (referred to hereinafter as lower large substrate 21A), and an upper substrate 22A (referred to hereinafter as upper large substrate 22A).

The lower large substrate 21A and the upper large substrate 22A are bonded together with frame-shaped seals for the individual panels 20 interposed therebetween. The lower large substrate 21A and the upper large substrate 22A face each other with a predetermined gap between them provided by the seals.

A connection electrode forming section C is provided on an extension C' from the region defined by each frame-shaped seal 27. Lead wiring and connection electrodes are provided in the connection electrode forming section C. An electro-optical conversion member described below is injected into the region defined by the frame-shaped seal 27.

A liquid crystal device is produced from a panel 20 by injecting a liquid crystal as the electro-optical conversion member into the region defined by the frame-shaped seal 27. As shown in FIG. 2, transparent electrodes 23 and an oriented film 25 are formed in this order on the lower large substrate 21A for each panel 20 (before the panel is filled with liquid crystal). Similarly, transparent electrodes 24 and an oriented film 28 are formed in this order on the upper large substrate 22A for each panel 20.

In addition, connection electrodes 29 such as lead wiring electrodes are provided on the connection electrode forming section C for connection to the transparent electrodes 23 on the lower large substrate 21A and for connection through a transfer structure to the transparent electrodes 24 on the upper large substrate 22A. Connection electrode forming sections C are present on at least one of the lower and upper large substrates 21A, 22A; in FIGS. 1 and 2, they are present only on the lower large substrate 21A.

Figure 3:
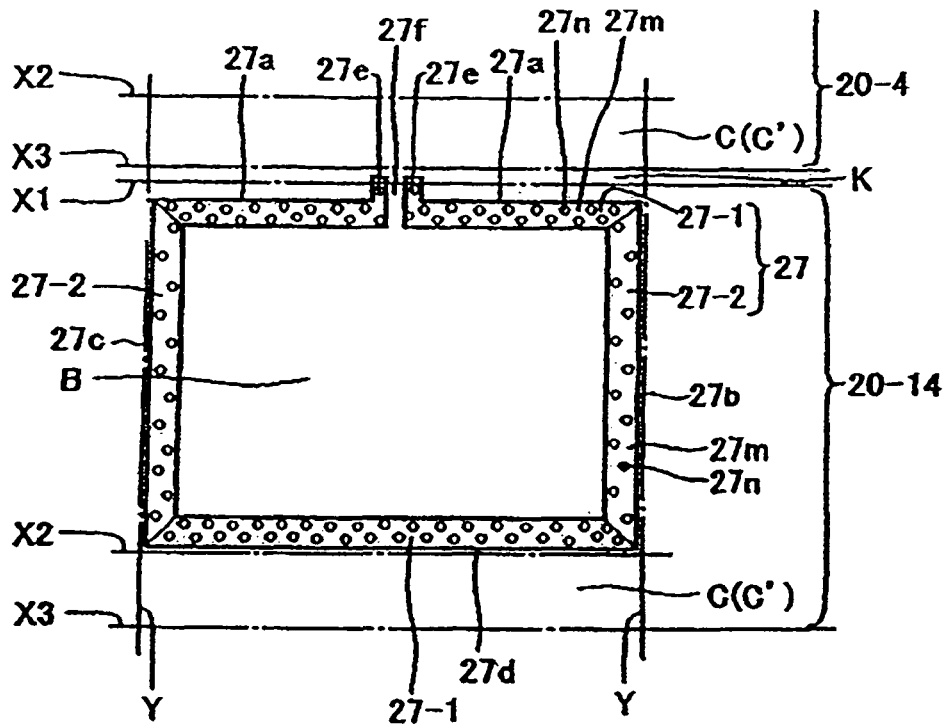
FIG. 3 is a partially enlarged transparent plan view of section B of the large substrate in FIG. 1.

As shown in FIG. 3, a rectangular frame-shaped seal 27 has four sides formed by four seal members 27a, 27b, 27c, and 27d. Seal members 27a and 27d are coplanar and mutually facing; seal members 27b and 27c are likewise coplanar and mutually facing. Seal member 27a has a cutout at or near its longitudinal center (or any other location, such as at one end of seal member 27a, for example), which, together with projections 27e projecting on both sides of the cutout, forms an injection port 27f.

The seal 27 is formed from two types of sealing materials: a first sealing material 27-1, and a second sealing material 27-2. The first and second sealing materials 27-1, 27-2 are both made of a resin adhesive 27m containing gap adjustment members (also referred to as spacers) 27n. The two types of sealing materials used in the first example contain the gap adjustment members 27n in different proportions. For finer gap adjustment, however, the sealing materials used for the individual seal members of the frame-shaped seal 27 may be selected from three or more types of sealing materials containing gap adjustment members 27n in different proportions, depending on gap variations, gap irregularities, and so on.

Among the four seal members 27a, 27b, 27c, and 27d of the frame-shaped seal 27, the seal members 27a and 27d located adjacent to the extension C' are formed from a sealing material containing a higher proportion of spacers 27n than the other two seal members 27b and 27c. This means that the seal member 27a adjacent to the extension C' in FIGS. 1-3 contains a higher density of spacers 27n in the adhesive 27m than the seal members 27b and 27c that meet seal member 27a at right angles. In the first example, seal members 27a and 27d contain 3 wt % spacers 27n, while seal members 27b and 27c contain 1 wt % spacers 27n.

FIG. 3 is a transparent view of the single panel 20-14 in the large substrate in FIG. 1. The seal member 27d adjacent to the extension C' (on the lower large substrate 21A) for the connection electrode forming section C of panel 20-14 and the seal member 27a adjacent to the extension C' (on the lower large substrate 21A) of the panel 20-4 adjacent to panel 20-14 (See FIG. 1) are formed from the first sealing material 27-1, containing the higher proportion of spacers 27n (a larger number of spacers per unit amount of the adhesive).

Seal members 27b and 27c are formed from the second sealing material 27-2, containing the lower proportion of spacers 27n (a smaller number of spacers per unit amount of the adhesive).

Preferably, the seal contains 0.5-5 wt % spacers. In addition, the first sealing material 27-1 preferably contains 2-3 wt % more spacers than the second sealing material 27-2.

The spacers 27n may be silica balls, fiberglass balls, plastic balls, or the like. The gap between the lower and upper large substrates 21A, 22A is essentially adjusted by the particle size of the spacers 27n. If the spacer densities in the individual seal members are also adjusted as in the first example, gap variations and irregularities caused by the seal members can substantially be eliminated.

The resin adhesive 27m may be a thermosetting resin such as an epoxy resin, or an ultraviolet-curing acrylic resin. When a thermosetting resin is used, the seal 27 is cured by heating. When an ultraviolet-curing resin is used, the seal 27 is cured by ultraviolet irradiation. In the first example, the resin adhesive 27m is a thermosetting epoxy resin, while the spacers 27n are silica balls.

In FIGS. 1 and 2, dot-dash lines X1, X2, X3, and Y are cutting lines along which the large substrate (mother substrate) is cut.

Cutting lines X1, X2, and X3 extend in the horizontal direction in FIG. 1. The large substrate is cut along cutting lines X1, X2 and X3 into strips each including a plurality of panels 20 arranged in a row.

Cutting along cutting line X1 trims the projecting tips of the projections 27e located on the two sides of the injection port 27f of each seal 27. Cutting along cutting line X2 removes an unnecessary portion D of the upper large substrate 22A covering the connection electrode forming sections C. Cutting along cutting line X3 finishes each extension C' to a predetermined size. Cutting along cutting lines X3 and X1 removes an area K including the projecting tips of each injection port.

An electro-optical conversion member such as a liquid crystal is injected into the individual panels 20 in the strip obtained by cutting the large substrate along cutting lines X1, X2, and X3, and the injection ports are then sealed to encapsulate the electro-optical conversion member inside individual seals. Then, the strip is cut along cutting lines Y into individual panels 20 to obtain liquid crystal devices (panels filled with the electro-optical conversion member).

Next, a method of manufacturing individual panels and liquid crystal devices from a large substrate having seals formed from the first and second sealing materials 27-1, 27-2 containing different proportions of spacers will be described mainly with reference to the flowchart in FIG. 4, and also with reference to FIG. 5.

FIG. 5 shows the patterns in which the seal members of the seal 27 of the panel 20-14 shown in FIG. 3 are formed from the first and second sealing materials on the lower and upper large substrates.

Step 1: forming the mother substrates. Oriented films and other components are formed for individual panels on the large substrates (of the mother substrate) according to the panel specifications. The lower and upper large substrates 21A, 22A are thus formed.

The formation of the lower and upper large substrates 21A, 22A includes a step of forming transparent electrodes 23, 24 on large glass substrates (the electrodes are formed by patterning, for example), a step of forming oriented films 25, 26 thereon and rubbing their surfaces, a step of forming color filters (when required), and steps of forming insulating films and flattening films (these steps form the mother substrates). The lower and upper large substrates 21A, 22A may be plastic substrates, instead of glass substrates.

Step 2: forming seal members from the first sealing material. Seal members are formed from the first sealing material 27-1 on only the lower large substrate 21A.

Figures 5A, 5B:
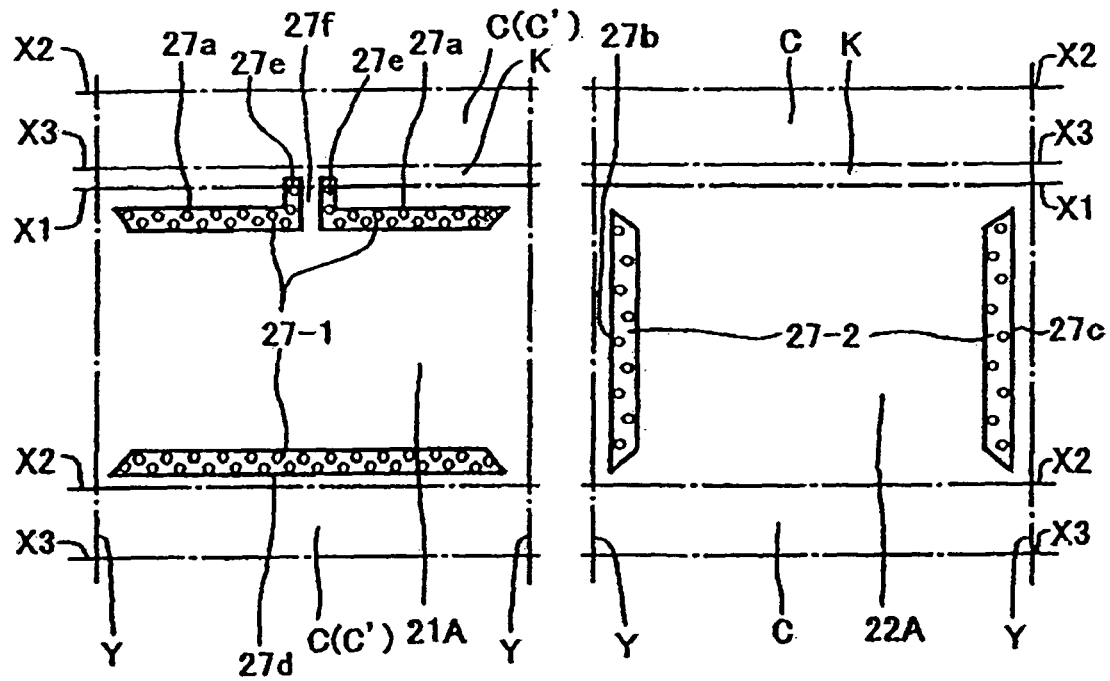
FIG. 5(A) shows the lower substrate in the large substrate in FIG. 1, with first seal members disposed thereon.
FIG. 5(B) shows the upper substrate in the large substrate in FIG. 1, with second seal members disposed thereon.

FIG. 5(A) shows an opposed pair of seal members 27a, 27d formed from the first sealing material 27-1 on the lower large substrate 21A, the seal member 27a having projections 27e and an injection port 27f. As described above with reference to FIG. 3, the seal members 27a, 27d disposed on the lower large substrate 21A are adjacent to extensions C' for connection electrode forming sections C. The first sealing material 27-1 can be applied by screen printing, dispenser coating, inkjet printing, or other means. In the first example, screen printing is used and the thickness of the applied sealing material is two to three times the intended gap width. For example, for a 5 μm gap, the applied sealing material is 10 to 15 μm thick.

Step 3: forming seal members from the second sealing material. Seal members are formed from the second sealing material 27-2 on the upper large substrate 22A.

FIG. 5(B) shows a pair of seal members 27b, 27c formed from the second sealing material 27-2 on the upper large substrate 22A. The seal members formed from the second sealing material 27-2 are formed by the same method as the seal members formed from the first sealing material 27-1, described above.

Step 4: bonding the substrates together. The lower large substrate 21A with the seal members 27a and 27d formed from the first sealing material 27-1 and the upper large substrate 22A with seal members 27b and 27c formed from the second sealing material 27-2 are placed together with the first and second sealing materials 27-1 and 27-2 interposed between them. The lower and upper large substrates 21A, 22A are placed so that their pixel-forming electrodes are mutually aligned.

Then, external pressure is applied to the lower and upper large substrates 21A, 22A to bond them together and to join the seal members 27a, 27d of the first sealing material 27-1 to the seal members 27b, 27c of the second sealing material 27-2, thereby forming frame-shaped seals 27 as shown in FIG. 3. The seals 27 thus formed are cured by heat treatment under pressure, whereby the lower and upper large substrates 21A, 22A are fastened together with a predetermined gap between them.

The above pressure is 0.2 to 1 kg/cm² and is applied by use of an air bag or other pressurization device. The heat treatment for curing the seals 27 is performed using a baking apparatus at a temperature in the range of 150° C. to 180° C. for 30 to 90 minutes. The heat treatment conducted in the first example is appropriate for seals containing a thermosetting epoxy resin as the resin adhesive 27m. If an ultraviolet-curing resin is used, the seals are cured by an ultraviolet irradiation process.

Step 5: first cuts. The bonded lower and upper large substrates 21A, 22A are cut in a first cutting operation.

First, the bonded lower and upper large substrates 21A, 22A are cut along cutting lines X3 to obtain strips each including a plurality of panels 20 arranged in a row. Then, one side (near the projections 27) of each strip defined by adjacent cutting lines X3 is cut along cutting line X1 to remove the region K including the projecting tips of the projections 27e of each injection port. The upper large substrate 22A of the strip is then cut along cutting line X2 to remove the unnecessary region D from the upper large substrate 22A (See FIG. 2). When region D is removed from the upper large substrate 22A, the connection electrodes 29 in the connection electrode forming section C on the lower large substrate 21A are exposed.

In the above example, the lower and upper large substrates 21A, 22A are cut simultaneously, first along the cutting lines X3 to obtain strips defined by adjacent cutting lines X3, and then along cutting lines X1. Alternatively, the lower and upper large substrates 21A, 22A may be cut first along both cutting lines X1 and X3 to form strips, each defined by the pair of cutting lines X1 and X3 located on opposite sides of a cutting line X2, and then each strip may be cut along cutting line X2.

The cutting can be performed by scribing, dicing, or other means. Cutting along these cutting lines produces strips each having injection ports 27f opening outward and aligned in a row (these strips are strings of empty panels not yet filled with an electro-optical conversion member).

Step 6: injecting and encapsulating the electro-optical conversion member. The electro-optical conversion member is injected through the injection ports 27f into the individual injection regions B defined by the frame-shaped seals 27 (formed by the seal members 27a, 27b, 27c, and 27d). When the injection is completed, the electro-optical conversion member is encapsulated inside each frame-shaped seal 27 by sealing the injection port 27f. The liquid crystal used as the electro-optical conversion member in the first example is injected into the plurality of injection regions B all at once using a vacuum injection device. After the liquid crystal is injected, a port sealing member made of a UV-curing resin is applied to the site of each injection port 27f and is cured by ultraviolet irradiation to seal the injection ports 27f to encapsulate the liquid crystal.

With this, a plurality of panels are formed in the strip with the electro-optical conversion member encapsulated therein (liquid crystal devices with the liquid crystal encapsulated therein if the electro-optical conversion member is a liquid crystal).

Step 7: second cuts. Each strip including a plurality of panels filled with the liquid crystal or another electro-optical conversion member is then cut along cutting lines Y to obtain individual panels (liquid crystal devices).

The second cuts along cutting lines Y are performed in a manner similar to the first cuts described above. Cutting along cutting lines Y produces individual complete panels (liquid crystal devices). Then, polarizing plates are formed on the upper and lower surfaces of each panel and a flexible printed circuit board (FPC board) or a driver IC for driving the electro-optical conversion member are placed on the connection electrodes 29 or connection terminals in the connection electrode forming section C (COG: Chip On Glass) to obtain a more functional liquid crystal device In this embodiment, as described above, the seal members are formed from two types of sealing materials 27-1, 27-2 containing different proportions of spacers 27n in a resin-based adhesive 27m. In each seal, the first sealing material 27-1, which contains a higher proportion of spacers 27n in the resin-based adhesive 27m, is used for seal member 27a, which is adjacent to the extension C' for the connection electrode forming section C, and the opposite seal member 27d. The seal member 27a of one panel (for example, panel 20-14 shown in FIG. 1) is relatively distant from the seal member 27d of the next panel (panel 20-4 in FIG. 1) adjacent across cutting line X3 because these seal members 27a and 27d are separated by the connection electrode forming section C and the projecting tip clipping area K.

Accordingly, these seal members 27a and 27d are subject to relatively high-pressure during pressure bonding. To resist this externally applied pressure, these seal members 27a and 27d are formed from the first sealing material, which contains a larger number of spacers 27n per unit area.

By using the first sealing material 27-1 for the seal members 27a and 27d that are more widely spaced, compared to seal members 27b and 27c, it is possible to have seal members 27a and 27d flatten by the same amount as seal members 27b and 27c and thus to avoid the problem of gap irregularities due to thickness variations in a single panel. More specifically, by increasing the number of spacers 27n per unit area, it is possible to make seal members 27a and 27d more resistant to the externally applied pressure and thus to prevent seal members 27a and 27d from flattening and becoming thinner than seal members 27b and 27c.

Conversely, seal member 27b in one panel is close to seal member 27c in the adjacent panel. Accordingly, these seal members 27b and 27c are formed from the second sealing material 27-2, which contains fewer spacers 27n in the resin-based adhesive (i.e., a smaller number of spacers per unit amount of the adhesive).

For example, seal member 27b in a panel 20-14 is close to seal member 27c in the right-adjacent panel 20-15; seal member 27c of panel 20-14 is also close to seal member 27b in the left-adjacent panel 20-13. During pressure bonding, the applied pressure acts simultaneously on the two mutually adjacent seal members 27b and 27c and is accordingly distributed between them. The pressure acting on seal member 27b of the one panel and seal member 27c of the adjacent panel is therefore reduced and does not greatly flatten these seal members. Accordingly, although being formed from the second sealing material, which contains fewer spacers 27n per unit area than the first sealing material, seal members 27b and 27c can resist the externally applied pressure and do not flatten greatly.

As described above, two types of sealing materials are used, namely first and second sealing materials 27-1, 27-2 containing different proportions of spacers 27n. By using the first sealing material 27-1, containing a higher proportion of spacers 27n, for the seal members subject to a higher pressure during pressure bonding and the second sealing material 27-2, containing a lower proportion of spacers 27n, for the seal members subject a lower pressure, it is possible to have all the seal members flatten equally and thereby to reduce gap irregularities in the panel.

Because of the reduced gap irregularities, a panel filled with a liquid crystal as an electro-optical conversion member can display color images with improved image quality, without color unevenness and luminance unevenness. Unlike conventional techniques, no dummy seals are required, so no space needs to be provided for the dummy seals, and smaller substrates can be used, or a larger number of panels can be obtained per substrate, so the manufacturing cost can be reduced. Furthermore, the number of seals can be reduced and thus the material cost can be reduced.

SECOND EXAMPLE

Next, another example of a large substrate and a method of obtaining individual panels from this large substrate will be described with reference to FIGS. 6 to 10. The second example relates to a method for improving the productivity of aberration correcting liquid crystal panels (liquid crystal devices) by forming a plurality of aberration correcting liquid crystal panels in a large substrate and cutting individual panels from the large substrate (a method of manufacturing multiple panels at once from a large substrate).

Panels using a liquid crystal as an electro-optical conversion member include, in addition to liquid crystal display panels, aberration correcting liquid crystal panels used in optical pickup devices (panels for optical pickups), liquid crystal shutters used in cameras, and liquid crystal lenses. Since aberration correcting liquid crystal panels, liquid crystal shutters, and liquid crystal lenses are small in size, the manufacturing cost reduction effect of manufacturing methods that obtain many identical panels at once from a single large substrate is increased.

Figure 7:
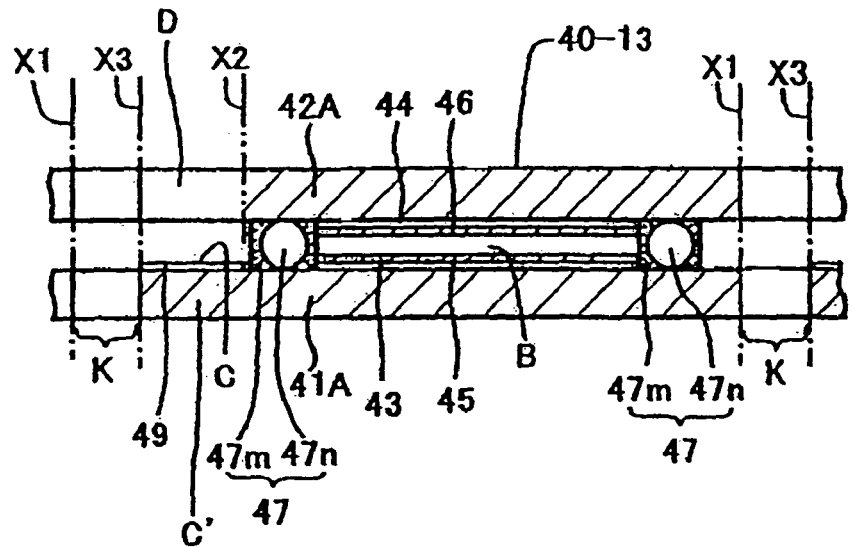
FIG. 7 is a cross-sectional view of the large substrate in FIG. 6 taken along line A-A.

A typical aberration correcting liquid crystal panel has the basic structure shown in FIG. 7. The large substrate (mother substrate) includes a lower large substrate 41A and an upper large substrate 42A. On the surface of the lower large substrate 41A facing the upper large substrate 42A, transparent electrodes 43 and oriented films 45 are formed for the individual panels to be produced. On the surface of the upper large substrate 42A facing the lower large substrate 41A, transparent electrodes 44 and oriented films 46 are formed for the individual panels to be produced.

Next, frame-shaped seals 47 for the individual panels are formed between the lower and upper large substrates 41A, 42A. Then, the lower and upper large substrates 41A, 42A are bonded together with the seals 47 interposed between them. A liquid crystal (for example, a nematic liquid crystal) 48 is encapsulated inside the individual frame-shaped seals 47 between the lower and upper large substrates 41A, 42A.

On one end of the lower large substrate 41A, an extension C' projects outside the frame-shaped seal 47. On the extension C', lead wiring electrodes and connection electrodes 49 are disposed for connection to the transparent electrodes 43 on the lower large substrate 41A and to the transparent electrodes 44 on the upper large substrate 42A.

The lower and upper large substrates 41A, 42A are cut into individual panels to obtain individual panels.

Figure 6:
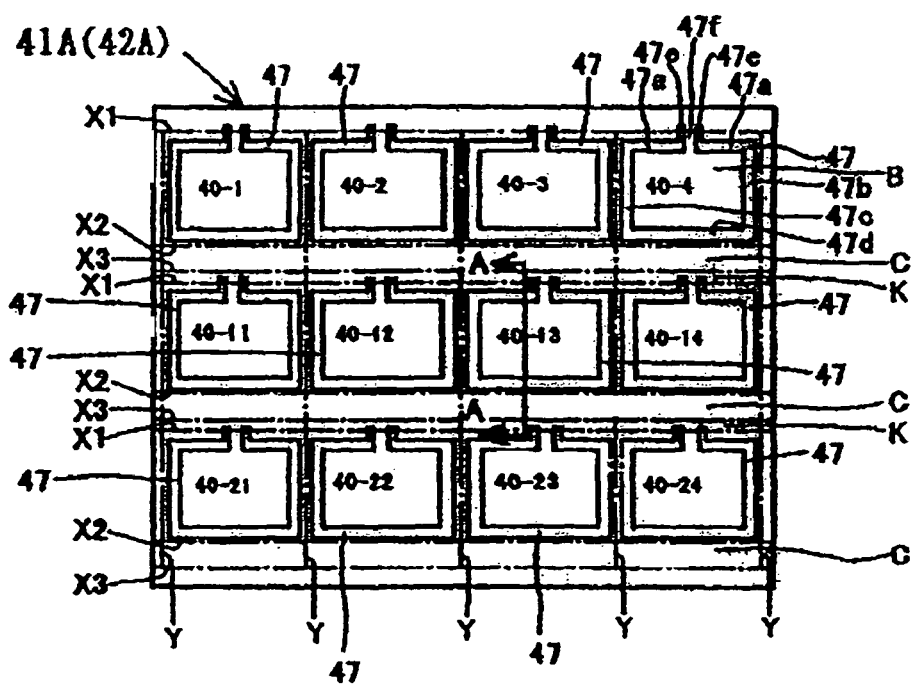
FIG. 6 is a transparent plan view of a plurality of panels formed in the large substrate made of two substrates bonded face to face in a second example according to the first embodiment of the present invention.

FIG. 6 illustrates how a plurality (twelve in the example shown in FIG. 6) of panels 40-1, 40-2, . . . , 40-24 are cut from the large substrate (mother substrate) formed by bonding the lower and upper large substrates 41A, 42A face to face.

For individual panels 40-1, 40-2, . . . , 40-24 (an arbitrary one of these panels will be hereinafter referred to as "panel 40"), frame-shaped seals 47 and connection electrode forming sections C are formed on the large substrate (mother substrate). Each panel 40 also has a connection electrode forming section C disposed on the extension C' on the lower substrate 41.

For each panel 40 to be produced, transparent electrodes 43 are formed on the lower large substrate 41A, as shown in FIG. 7, and an oriented film 45 is formed on the transparent electrodes 43. For each panel 40 to be produced, transparent electrodes 44 are also formed on the upper large substrate 42A, and an oriented film 46 is formed on the transparent electrodes 44. The oriented films may be omitted when liquid crystal devices are produced by injecting a polymer dispersed liquid crystal as the electro-optical conversion member into the panels.

The lower large substrate 41A has an extension C' extending from each frame-shaped seal 47. The connection electrode forming section C is located on the extension C'. In the connection electrode forming section C, there are provided lead wiring electrodes and/or wiring electrodes for connection to the pixel-forming transparent electrodes 43 on the lower large substrate 41A and for connection through a transfer-connection structure to the transparent electrodes 44 on the upper large substrate 42A, as well as connection electrodes 49 such as connection terminals for electrical connection to a control circuit board and or driver circuit board, which are circuits external to the panel. In the second example, the extension C' and the connection electrode forming section C are provided only on the lower large substrate 41A.

The frame-shaped seal 47 for each panel 40 consists of four seal members 47a, 47b, 47c, and 47d forming a rectangular or square frame as shown in FIG. 6. Seal members 47a and 47d face each other; seal members 47b and 47c face each other. Seal member 47a has an opening at its longitudinal center or thereabout, through which the electro-optical conversion member (liquid crystal) is injected. On both sides of the opening, there are projections 47e projecting outward from the rectangular frame. The opening between the projections 47a forms an injection port 47f through which the liquid crystal is injected.

The seal 47 formed for this single panel 40 has the same shape and dimensions as the seals 47 for the other panels 40.

The seal 47, like the seal in the first example described above, is formed from two types of sealing materials: a first sealing material 47-1 and a second sealing material 47-2. The first and second sealing materials 47-1, 47-2 contain gap adjustment members (spacers) 47n in a resin adhesive 47m. The first sealing material 27-1 contains a higher proportion of spacers 27n than the second sealing material 27-2.

In the second example, the first and second sealing materials 47-1, 47-2 comprise adhesives with the same proportions of spacers as in the first example. The seal accordingly contains 0.5 to 5 wt % spacers. In addition, the first sealing material 47-1 preferably contains 2 to 3 wt % more spacers than the second sealing material 47-2.

The horizontal cutting lines X1, X2, and X3 and vertical cutting lines Y shown in FIG. 6 are used similarly to the cutting lines X1, X2, X3, and Y in the first example (See FIG. 1).

In FIGS. 6 and 7, cutting along cutting line X1 trims the projecting tips of the projections 47e on both sides of the injection ports 47f of seal members 47a. Cutting the lower and upper large substrates 41A, 42A simultaneously along cutting lines X1 produces strips each defined by a mutually adjacent pair of cutting lines X1. Cutting along cutting lines X2 trims and removes an unnecessary portion D from the upper large substrate 42A covering the connection electrode forming sections C. Cutting along cutting lines X3 finishes the extensions C' to a predetermined size. Cutting along cutting lines X3 and X1 removes the area K including the projecting tips of the injection ports.

Next, a liquid crystal is injected as the electro-optical conversion member through the injection ports into the plurality of panels 40 (empty panels) connected by cutting lines Y in the strip.

After the liquid crystal is injected, the injection ports of the panels in the strip are sealed.

Figure 10:
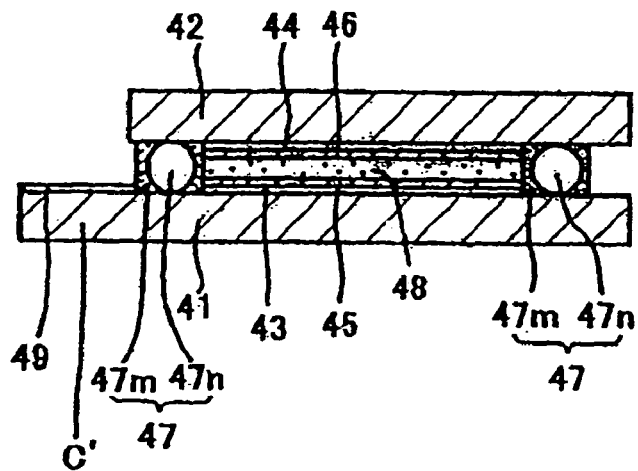
FIG. 10 is a cross-sectional view showing essential components of a single panel cut from the large substrate in FIG. 6.

The strip is then cut along cutting lines Y to obtain individual panels as shown in FIG. 10.

As described above, the liquid crystal or other electro-optical conversion member is injected and encapsulated in the individual panels 40 in the strip obtained by cutting along cutting lines X1, X2, and X3. Then, the strip is cut along cutting lines Y to obtain individual liquid crystal devices (panels 20 filled with the electro-optical conversion member).

The method of manufacturing the panels in the second example will now be described. The manufacturing steps are essentially the same as in the first example (FIG. 4). In view of this, the following description of the manufacturing method will focus on steps different from those in the first example and refer to the identical steps only when necessary.

Figure 8:
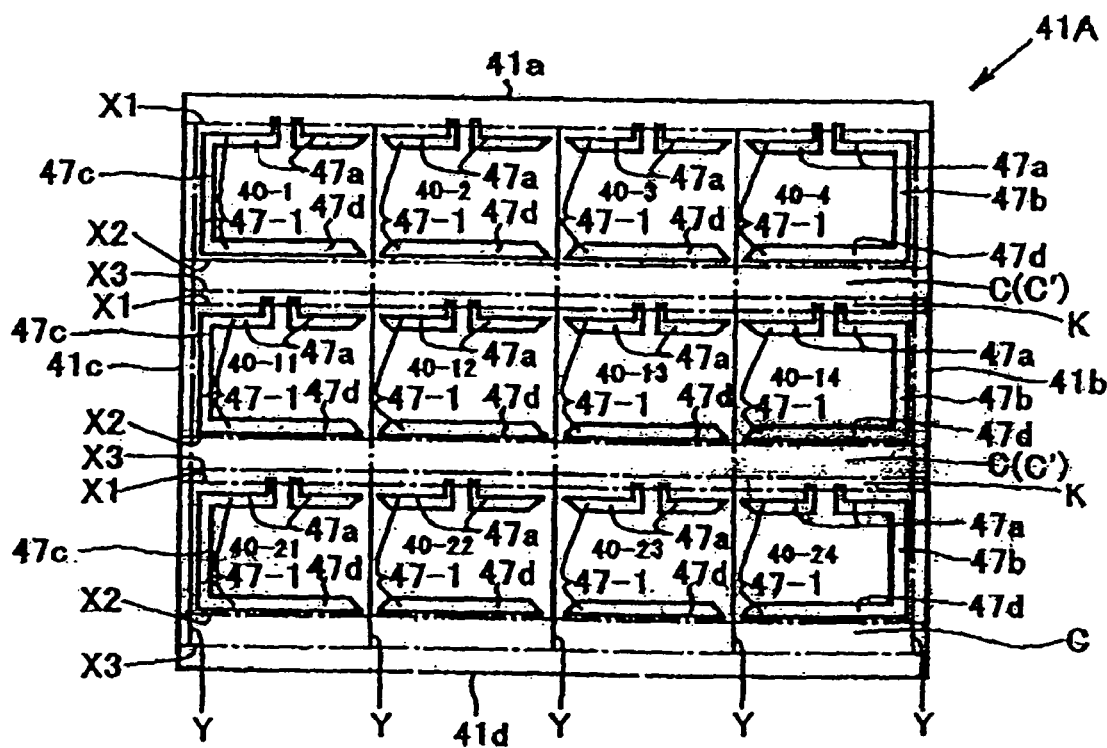
FIG. 8 shows the lower substrate in the large substrate in FIG. 6, with first seal members disposed thereon.

FIG. 8 shows the seal members formed from the first sealing material 47-1 on the lower large substrate 41A.

The seal members 47a and 47d adjacent to the extension C' (to be used as the connection electrode forming section C) are formed from the first sealing material 47-1 on the lower substrate 41A. The first sealing material 47-1 is also used to form the seal members 47a adjacent to outer edge 41a of the lower large substrate 41A, the seal members 47b adjacent to outer edge 41b, the seal members 47c adjacent to outer edge 41c, and the seal members 47d adjacent to outer edge 41d.

Since seal members 47d of panels 40-1, 40-2, 40-3, and 40-4 are distant from seal members 47a of panels 40-11, 40-12, 40-13, and 40-14, respectively, being separated by the extensions C', these seal members 47d, 47a are also formed from the first sealing material 47-1.

Similarly, since seal members 47d of panels 40-11, 40-12, 40-13, and 40-14 are distant from seal members 47a of panels 40-21, 40-22, 40-23, and 40-24, respectively, being separated by the extensions C', these seal members 47d, 47a are also formed from the first sealing material 47-1. Furthermore, since seal members 47d of panels 40-21, 40-22, 40-23, and 40-24 are adjacent to the extensions C' located therebelow, these seal members 47d are also formed from the first sealing material 47-1.

Seal members 47a of the panels 40-1, 40-2, 40-3, and 40-4, which are adjacent to outer edge 41a of the lower large substrate 41A and are not close to seal members of other panels, are also formed from the first sealing material 47-1. Seal members 47b of the panels 40-4, 40-14, and 40-24, which are adjacent to outer edge 41b of the lower large substrate 41A and are not close to seal members of other panels, are also formed from the first sealing material 47-1. Seal members 47c of the panels 40-1, 40-11, and 40-21, which are adjacent to outer edge 41c of the lower large substrate 41A and are not close to seal members of other panels, are also formed from the first sealing material 47-1. Seal members 47d of the panels 40-21, 40-22, 40-23, and 40-24, which are adjacent to outer edge 41d of the lower large substrate 41A and are not close to seal members of other panels, are also formed from the first sealing material 47-1.

As described above, the seal members adjacent to the four outer edges of the lower large substrate 41A are also formed from the first sealing material 47-1.

Accordingly, the seal members adjacent to each extension C' and the seal members adjacent to the four outer edges of the large substrate are formed from the first sealing material 47-1.

As described with regard to the first example, the seal members 47c, 47a, 47d shown in FIG. 8 have no immediately adjacent seal members, or no adjacent seal members at all. When the lower and upper large substrates are bonded under pressure to form a large substrate, these seal members 47c, 47a, 47d experience a higher pressure and suffer a larger thickness deformation than other seal members. To make these seal members 47c, 47a, 47d more resistant to the externally applied pressure and reduce their thickness deformation to that of the other seal members, the number of spacers 47n per unit area in these seal members 47c, 47a, 47d is increased. The gap between the lower and upper large substrates 41A, 42A is thereby kept uniform in the entire area.

Figure 9:
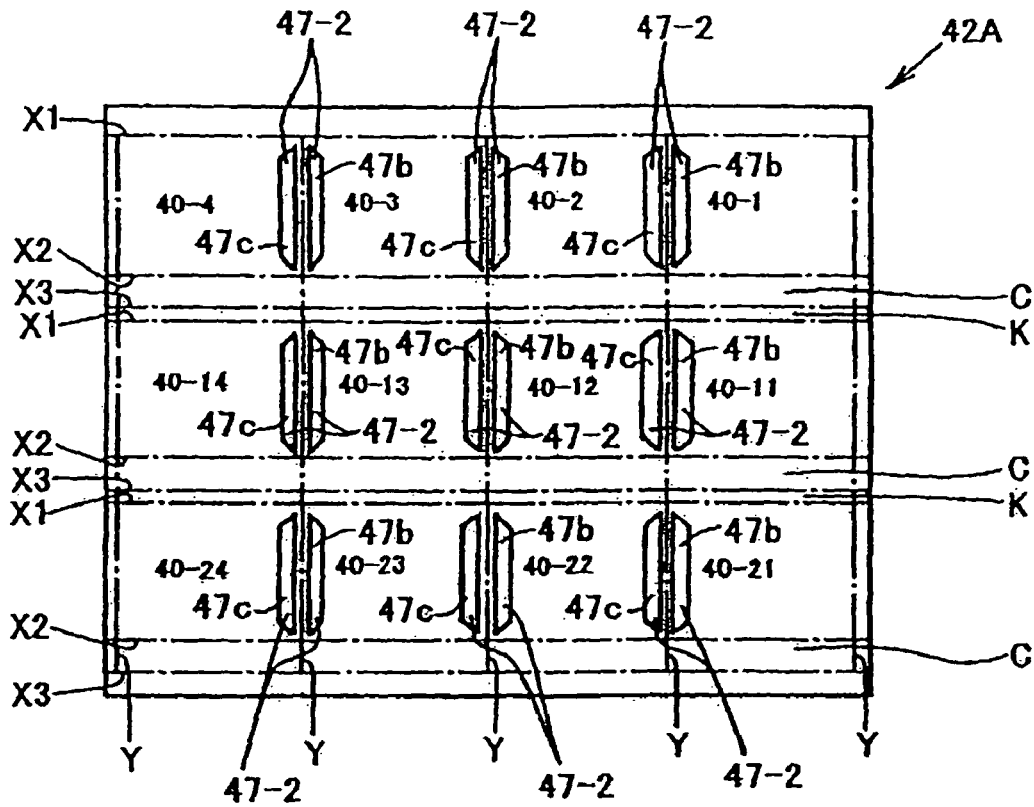
FIG. 9 shows the upper substrate in the large substrate in FIG. 6, with second seal members disposed thereon.

FIG. 9 shows the seal members formed from the second sealing material 47-2 on the upper large substrate 42A.

Among the four seal members 47a, 47b, 47c, and 47d of the frame-shaped seal 27, all the seal members other than the seal members 47a, 47c, 47d disposed on the lower large substrate 41A (See FIG. 8) are disposed on the upper large substrate 42A. The upper large substrate 42A shown in FIG. 9 is then turned upside down and placed on the lower large substrate 41A shown in FIG. 8.

More specifically, as shown in FIG. 9, the seal members formed from the second sealing material 47-2 and disposed on the upper large substrate 42A are seal members 47b of panels 40-1, 40-11, and 40-21, seal members 47b and 47c of panels 40-2, 40-12, 40-22, 40-3, 40-13, and 40-23, and seal members 47c of panels 40-4, 40-14, and 40-24.

Since the seal members formed from the second sealing material 47-2 form closely spaced pairs, as can be seen from FIG. 9, and provide a wider area to receive the externally applied pressure during bonding, the pressure is distributed among the seal members, reducing the pressure applied to the individual seal members. Accordingly, despite having fewer spacers 47n per unit area in their sealing material 47-2, these seal members provide a predetermined resistance or reaction to the externally applied pressure and suffer only slight thickness deformation.

In the second example, the seal members are made by screen printing as in the first example.

Thus, the lower and upper large substrates 41A, 42A, each having seal members formed thereon, are aligned and bonded face to face under pressure with the seals interposed therebetween. The seal members on the lower and upper large substrates 41A, 42A are joined to each other, thereby forming frame-shaped seals 47 as shown in FIG. 6. The steps of applying pressure and bonding are the same as in the manufacturing method in the first example.

The resultant mother substrate is then cut along cutting lines X1, X2, and X3 to obtain strips each including a plurality of (empty) panels.

A liquid crystal is injected through the respective injection ports into the plurality of panels in each strip, and then the injection ports are sealed with port sealing members to encapsulate the liquid crystal inside the frame-shaped seals.

Next, each strip, including the panels filled with the liquid crystal, is cut along cutting lines Y to obtain individual liquid crystal panels or liquid crystal devices as shown in FIG. 10.

As described above, the seal 47 is formed from two types of sealing material: a first sealing material 47-1 containing a higher proportion of spacers 47n in the adhesive 47m, and a second sealing material 47-2 containing a lower proportion of spacers 47n in the adhesive 47m (fewer spacers per unit amount of the adhesive).

The first sealing material, containing the higher proportion of spacers 47n (more spacers per unit amount of the adhesive), is used to form the seal members that are subject to relatively high pressure, among the four seal members forming each frame-shaped seal. Having a larger number of spacers 47n per unit area, these seal members are more resistant to flattening. The seal members that are subject to relatively low pressure are formed from the second sealing material 47-2 containing a lower proportion of spacers 47n, i.e., fewer spacers 47n per unit area. In this manner, the thickness deformation is adjusted to the same value in all the seal members to obtain a panel with a uniform gap over its entire area. This effectively reduces correction errors and accordingly improves the correction accuracy in the aberration correcting liquid crystal device.

Instead of forming each seal member entirely of the first or entirely of the second sealing material, depending on its positional relationship with the adjacent seal member, as in the second example, each seal member may be formed partially of the first sealing material and partially of the second sealing material.

As described above, in the second example, two types of sealing materials are used: a sealing material containing a relatively high proportion of spacers 47n and a sealing material containing a relatively low proportion of spacers 47n. Alternatively, three or more types of sealing materials containing different proportions of spacers 47n may be used according to the amount of flattening of each seal member. This enables a more uniform gap adjustment to be made by preventing gap variations due to different amounts of pressure applied to different seal members.

According to the present invention, among the seal members of the seals disposed between the lower and upper large substrates forming the large substrate, those subject to a higher pressure are formed from the sealing material containing a higher proportion of spacers 47n, to increase the number of spacers 47n per unit area. These seal members are therefore more resistant to flattening. Seal members subject to a lower pressure are formed from the sealing material containing a lower proportion of spacers 47n, to decrease the number of spacers 47n per unit area. These seal members are accordingly less resistant to flattening. Accordingly, the gap irregularities between the upper and lower substrates of one panel can be minimized over the entire area of the panel. As a result, the error correction accuracy can be improved in the aberration correcting liquid crystal device.

The present invention is also applicable to circular frame-shaped seals. The first or second sealing material can be selected to form these seals depending on their proximity to other circular frame-shaped seals.

The first and second examples relate to a liquid crystal display device and a liquid crystal device that use a liquid crystal as an electro-optical conversion member. Substrates having seal members formed from the sealing materials of the present invention are also applicable to touch panels, however.

From the viewpoint of resistance to heat, moisture, and other conditions, a typical touch panel used for an onboard car navigation system is made of sheet glass or plastic substrates with an intervening gap of approximately 10 μm. If the gap varies significantly in different areas of the panel, the finger pressure required to cause contact will differ in these areas, leading to erroneous panel operations. The seal of the present invention can reduce gap irregularities and thus eliminate the above problem.

The seals and liquid crystal devices of the present invention can be implemented using either plastic or glass substrates. The present invention is also applicable to EL (electroluminescence) display devices and other devices having an EL material encapsulated between the opposite substrates.

Next, a second embodiment of the present invention will be described with reference to FIGS. 11-24.

THIRD EXAMPLE

Figure 11:
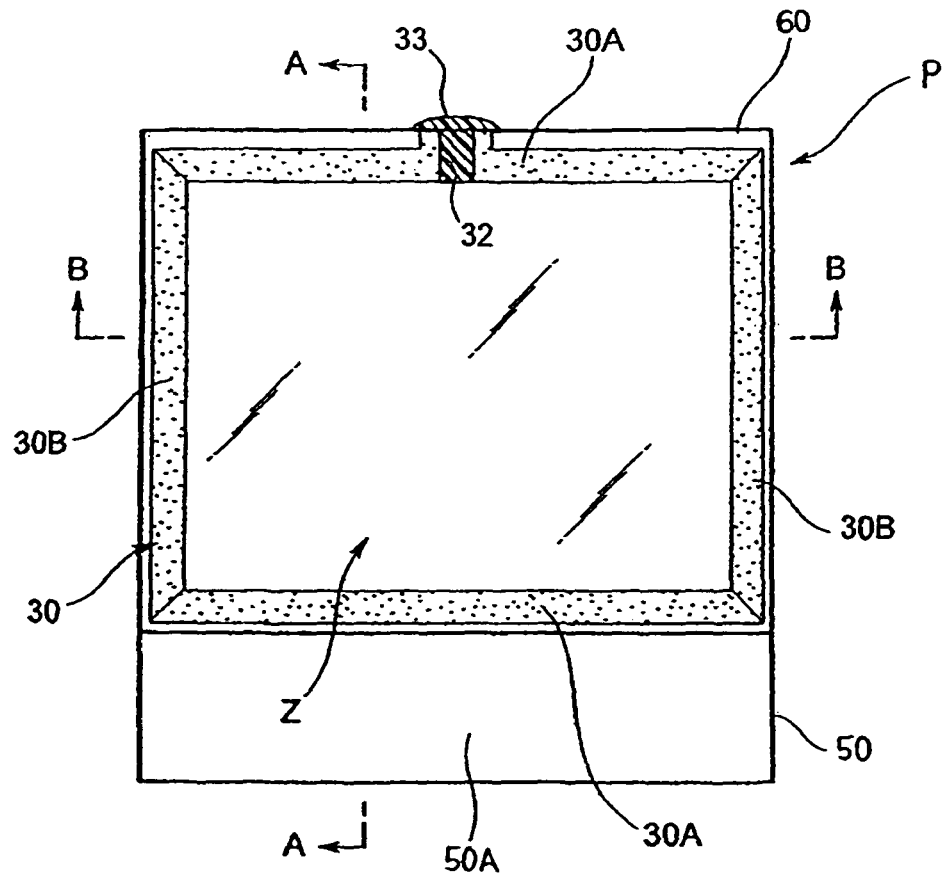
FIG. 11 is a transparent plan view of a single liquid crystal panel cut from a large substrate in a third example according to a second embodiment of the present invention.

The liquid crystal panel P shown in FIG. 11 includes two substrates: a lower substrate 50 and an upper substrate 60. The lower substrate 50 has an extension 50A protruding beyond at least one portion of the outer edges of the upper substrate 60. The extension 50A provides a COG (Chip On Glass) area for mounting an integrated circuit (IC) (not shown), but an IC is not necessarily mounted here. An FPC (Flexible Printed Circuit) that connects the liquid crystal panel to an external circuit outside the liquid crystal panel may connected by an anisotropic conductive adhesive to the wiring electrodes on the extension.

The lower and upper substrates 50, 60 constituting the liquid crystal panel P are bonded together with seals 30 between them. A seal 30 includes first seal members 30A, which are disposed at the edge of the upper substrate 60 adjacent to the extension 50A and the edge opposite to the extension 50A (the edge on the side of the injection port 32), and second seal members 30B, which are disposed at the other two edges of the upper substrate 60.

The liquid crystal panel P shown in FIG. 11 will now be described in detail with reference to the cross-sectional views in FIGS. 12 and 13.

The liquid crystal panel P includes a lower substrate assembly 50 including a transparent substrate 51 of glass or plastic, for example, as its base member. Transparent electrodes 52 made of ITO (Indium Tin Oxide) are formed by patterning (in an electrode formation step) on the surface of the lower substrate assembly 50 facing the upper substrate assembly 60. An insulating film 53 is formed on the transparent electrodes 52 (in an insulating film formation step) to prevent the transparent electrodes 52 on the lower substrate assembly 50 and the transparent electrodes 64 on the upper substrate assembly 60 from being electrically short-circuited by dust or foreign particles. Then, an oriented film 54 is formed on the upper surface of the insulating film 53 and rubbed (in steps of forming and rubbing the oriented film).

The upper substrate assembly 60 faces the lower substrate assembly 50 with a gap therebetween and includes as its base member a transparent substrate 51 made of a transparent material similar to that of the lower substrate assembly 50. A layer of color filters 62 with red (R), green (G), and blue (B) filters arranged in a striped, matrix, staggered, or other pattern is formed on the lower surface of the upper substrate 51, facing the lower substrate (in a color filter forming step). A flattening film 63 is formed on the color filters 62 (in a flattening film formation step). Transparent electrodes 64 made of a material similar to that of the transparent electrodes 52 are formed on the flattening film (protection film) 63 (in an electrode forming step). An oriented film 65 is formed on the transparent electrodes 64 and rubbed (in steps of forming and rubbing the oriented film).

The lower and upper substrate assemblies 50, 60 are bonded together with seals 30 made of a thermosetting epoxy resin, for example, interposed between them. The gap between the lower and upper substrates assemblies 50, 60 is adjusted to a predetermined value by means of spacers 31, i.e., gap adjustment members, mixed into the seals 30 (in step of bonding substrates facing each other).

Figure 12:
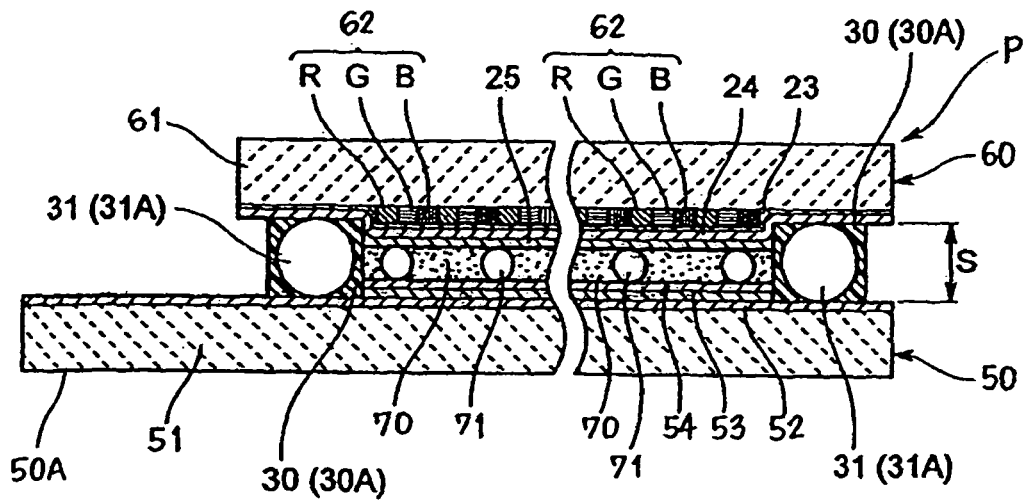
FIG. 12 is a cross-sectional view showing essential components of the liquid crystal panel in FIG. 11 taken along line A-A.
Figure 13:
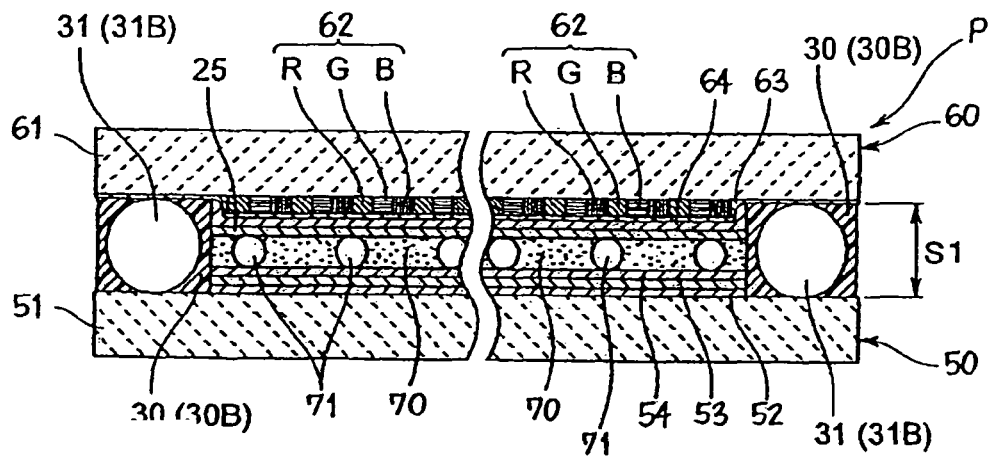
FIG. 13 is a cross-sectional view showing essential components of the liquid crystal panel in FIG. 11 taken along line B-B.

A space surrounded by the frame-shaped seal 30 (30A, 30B) shown in FIG. 11 is formed between the lower and upper substrate assemblies 50, 60 shown in FIGS. 12 and 13. A liquid crystal is injected into this space as an electro-optical conversion member through the injection port 32 provided in a portion of the seal 30 (in an injection step). After the liquid crystal is injected, the injection port 32 is sealed with port sealing resin 33 to form a liquid crystal layer 70 (in a port sealing step). In the liquid crystal layer 70, spacers 71 are disposed to adjust the gap between the substrates 10, 20, into which the liquid crystal is injected, to a predetermined value (in a step of scattering or emplacing spacers).

Figure 14:
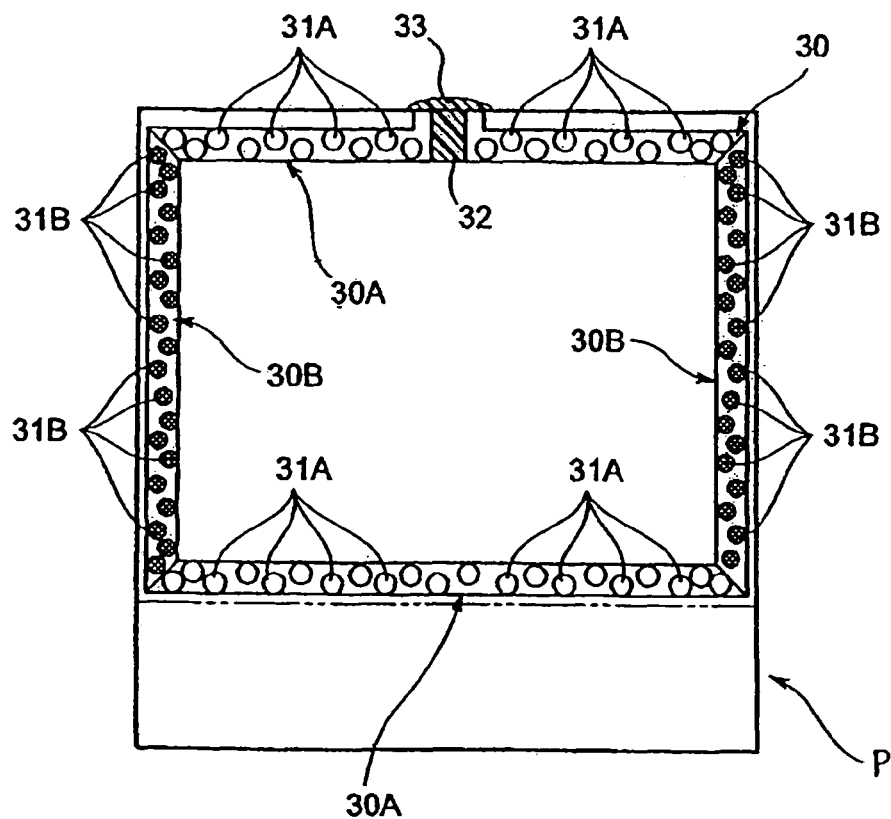
FIG. 14 schematically shows spacers scattered in the seal disposed in the panel shown in FIG. 11.
Figure 32:
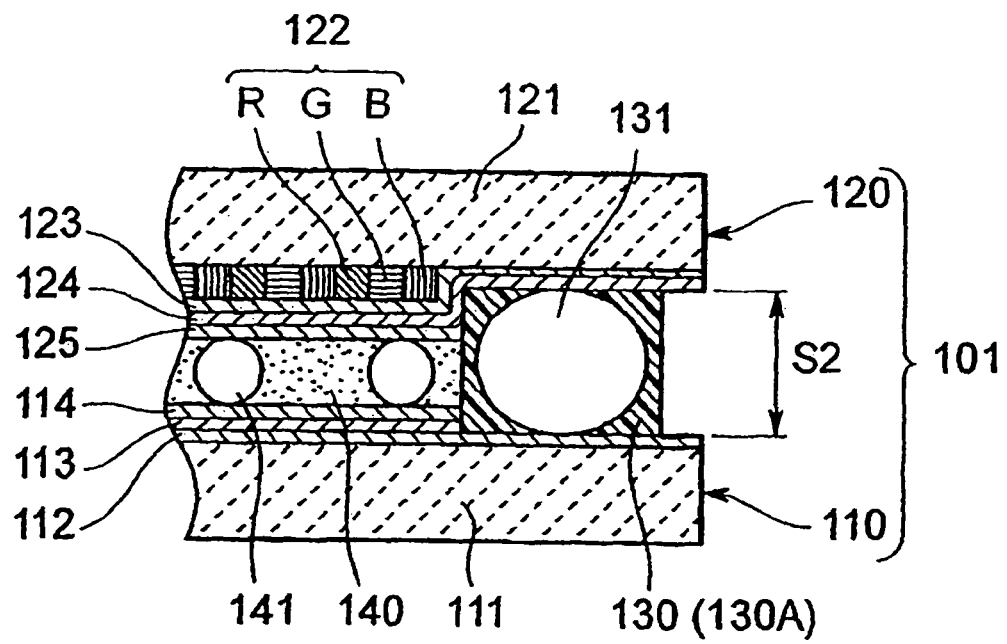
FIG. 32 is a cross-sectional view of the liquid crystal panel in FIG. 31 taken along line G-G.
Figure 33:
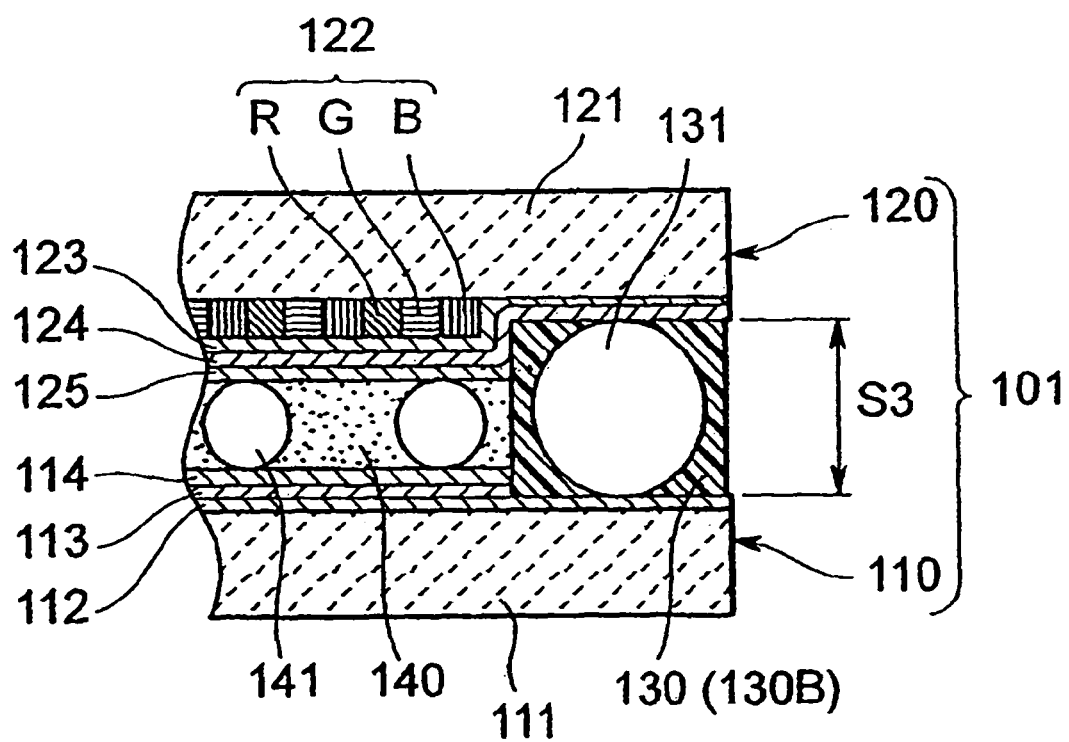
FIG. 33 is a cross-sectional view of the liquid crystal panel in FIG. 31 taken along line H-H.
Figure 34:
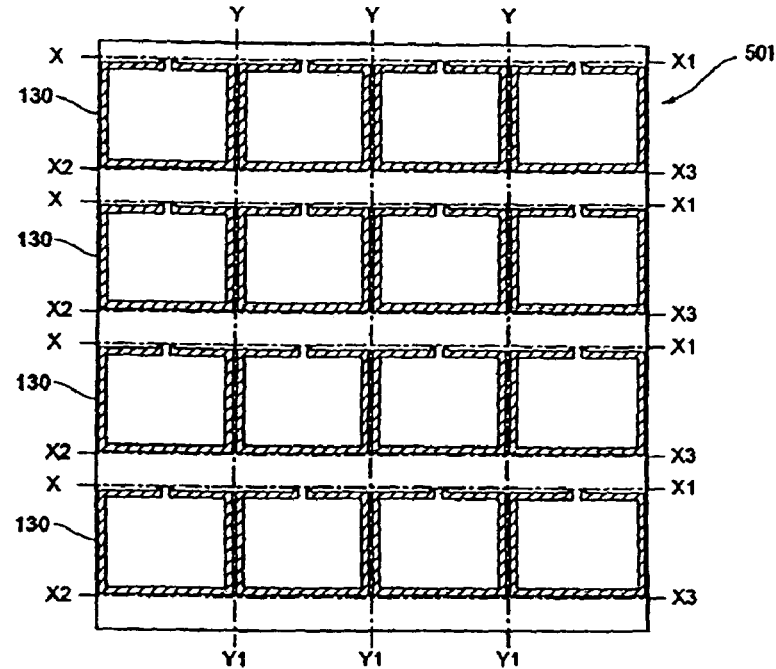
FIG. 34 is a transparent plan view of a large liquid crystal cell from which a large number of liquid crystal panels are produced, showing the state of the liquid crystal cells before they are filled with a liquid crystal.

Two types of spacers, differing in particle size, are provided in different parts of the seal 30 disposed in the liquid crystal panel P, as shown in FIG. 14. The first seal members 30A of the seal 30 contain first spacers 31A, shown in FIG. 15(A), with a particle size (average particle size) d of approximately 9.5 μm (by taking account of the total thickness 3 μm of the color filter and the overcoat, in addition to the diameter of a particle). The second seal members 30B contain second spacers 31B, shown in FIG. 15(B), with a particle size (average particle size) d1 of approximately 9 μm (by taking account of the total thickness 3 μm of the color filter and the overcoat). The average particle size d1 of the second spacers 31B is substantially equivalent to the minor axis of the conventional oblate spacer 131 (gap S2) shown in FIG. 32, for example.

Figure 31:
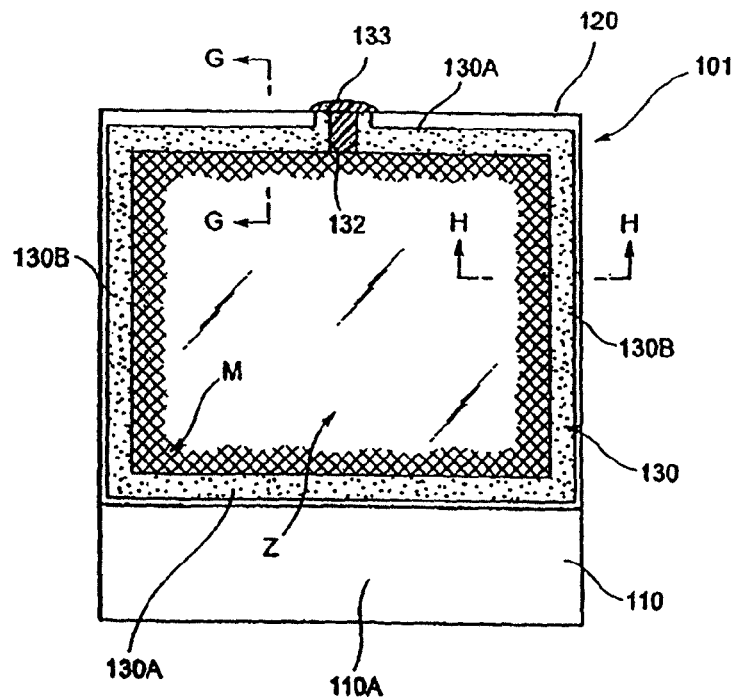
FIG. 31 is a transparent plan view of a liquid crystal panel showing a seal, its port sealing resin, and other components.

When the seal 30 (30A, 30B) having the above structure is applied to the liquid crystal panel P as shown in FIGS. 12 and 13, the gap S between the lower and upper substrate assemblies 50, 60 at the first seal members 30A containing the first spacers 31A (See FIG. 12) becomes substantially equal to the gap S1 between the lower and upper substrate assemblies 50, 60 at the second seal members 30B containing the second spacers 31B (see FIG. 13). Accordingly, the gap in the peripheral area around the display area Z of the liquid crystal panel P shown in FIG. 11 (See FIG. 31) becomes uniform, thereby preventing the occurrence of luminance unevenness M and improving the display quality. If the liquid crystal panel P is provided with a backlight (not shown) and a drive circuit, a display device or liquid crystal device with increased display quality and no luminance unevenness M can be obtained.

Figure 16:
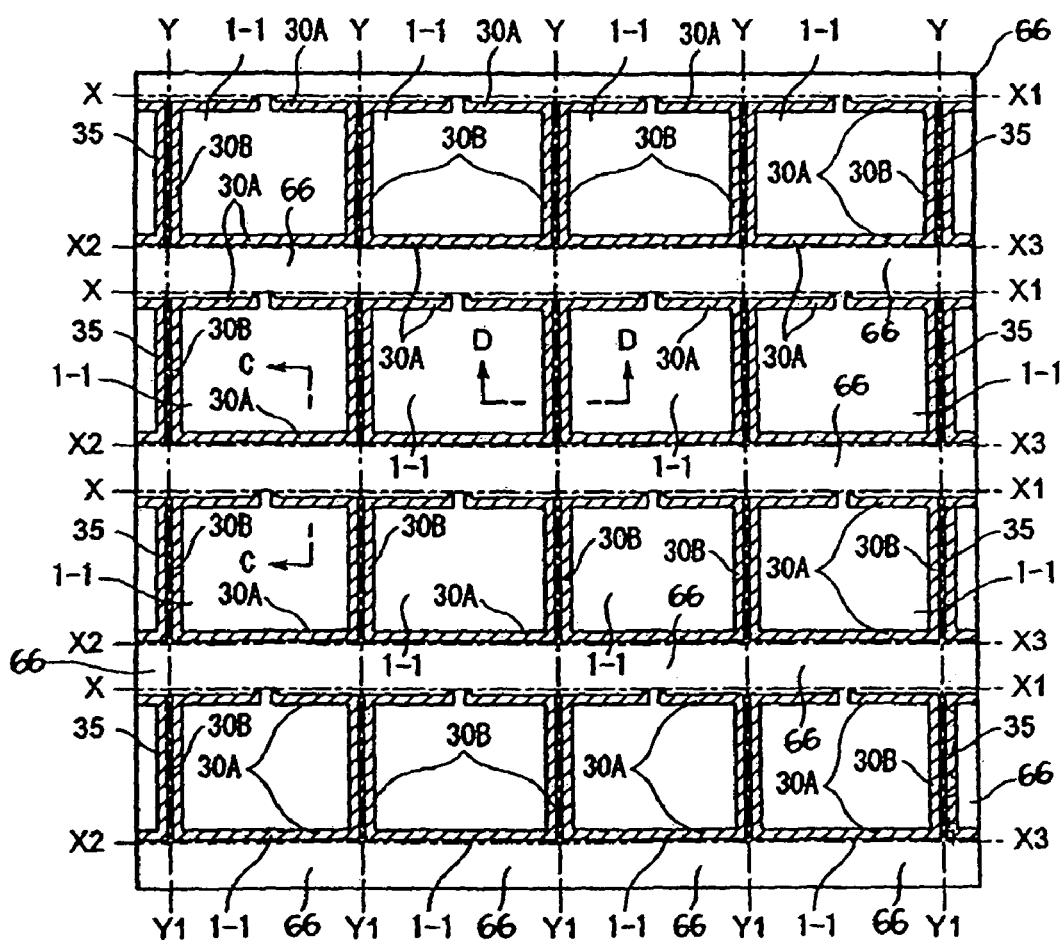
FIG. 16 is a plan view of a large liquid crystal cell from which a large number of liquid crystal panels as shown in FIG. 11 are produced at once.

The liquid crystal panel P having the above structure can be obtained from a large liquid crystal cell 101, that is, a large substrate (mother substrate), of the type shown in FIG. 16. The large liquid crystal cell 101 is first cut along cutting lines X-X1 (the upper and lower substrates are simultaneously cut along these line) and then cut along cutting lines X2-X3 (only the upper substrate is cut along these lines) to obtain strips each including a plurality of liquid crystal cells (one strip is composed of a plurality of liquid crystal cells connected in a row). Then, a liquid crystal is injected into the plurality of liquid crystal cells in the strip all at once. The injection ports 32 (See FIG. 14) are then sealed with port sealing resin 33. Then, the strip including the liquid crystal cells (liquid crystal panels) filled with the liquid crystal is cut along cutting lines Y-Y1 (the upper and lower substrates are cut simultaneously) using a laser cutting, breaking, or scribing device (not shown). These cutting operations produce a predetermined number of liquid crystal panels 1-1 from the large liquid crystal cell 101 shown in FIG. 16.

After the predetermined number of liquid crystal panels 1-1 are cut out, there remain extra unused substrate sections 66 at one and/or both ends of each strip. Dummy seals 35 are formed in the gap between the upper and lower substrates in the extra substrate sections 66 (see FIG. 16). In the upper large substrate assembly 60 of the large liquid crystal cell 101 shown in FIG. 17, there also remain unused extra substrate sections 66 facing the extensions 50A after the predetermined number of liquid crystal panels are cut out.

Figure 17:
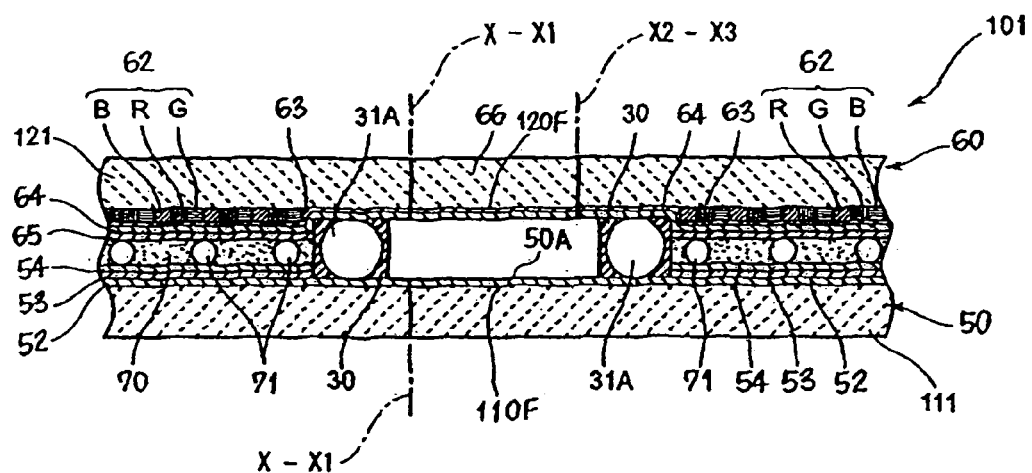
FIG. 17 is a cross-sectional view of the large liquid crystal cell in FIG. 16 taken along line C-C.
Figure 18:
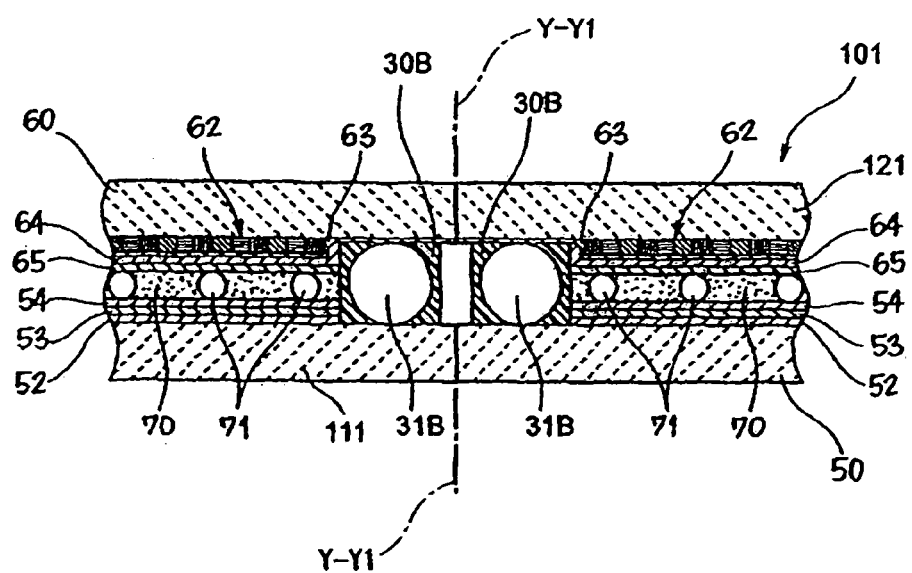
FIG. 18 is a cross-sectional view of the large liquid crystal cell in FIG. 16 taken along line D-D.
Figure 19:
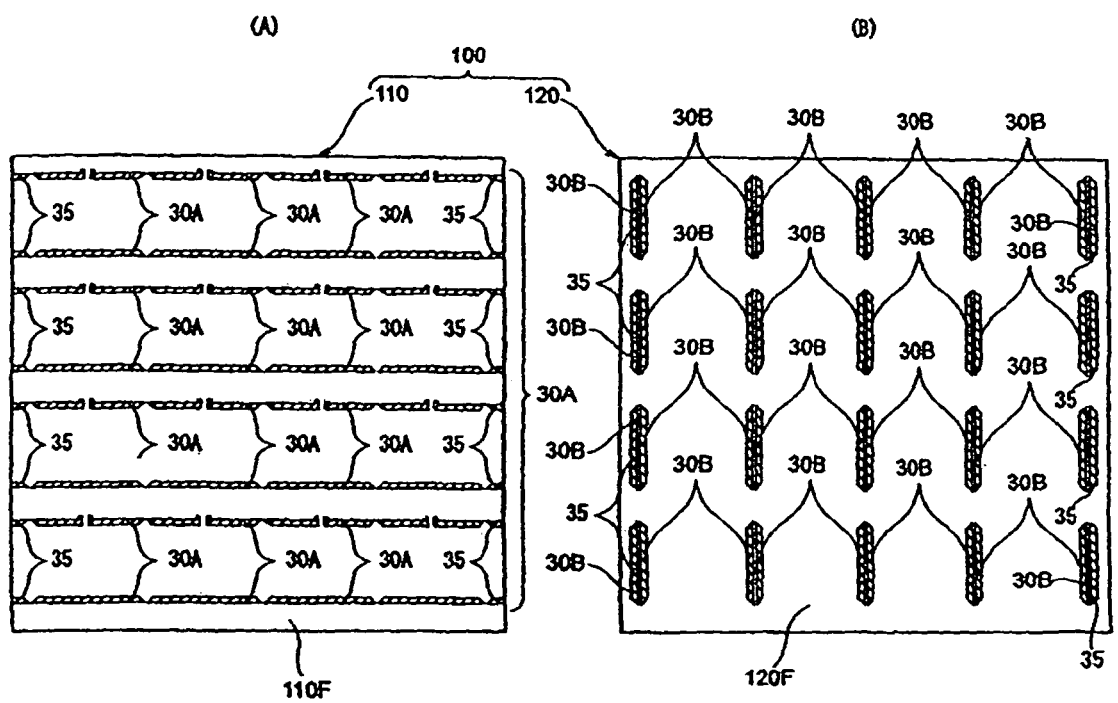
FIG. 19(A) is a plan view showing a pattern of first seal members and dummy seals on the lower large substrate in the large liquid crystal cell shown in FIG. 16.
FIG. 19(B) is a plan view showing a pattern of second seal members and dummy seals on the upper large substrate in the large liquid crystal cell shown in FIG. 16.

The large liquid crystal cell 101 is composed of the lower large substrate assembly 50 and the upper large substrate assembly 60. The lower large substrate assembly 50 has, as shown in FIGS. 17 and 18, a transparent substrate 111 as its base material. Transparent electrodes 52 are disposed on the surface 110F of the transparent substrate 111 facing the upper large substrate assembly 60 (See FIG. 19(A)). An insulating film 53 is disposed on each transparent electrode 52. Then, an oriented film 54 having a rubbed surface is formed on each insulating film 53. The first seal members 30A, containing the first spacers 31A with a particle size d of approximately 9.5 μm, and a plurality of dummy seals 35 made of the same sealing material as the first seal members 30A are formed on the surface 110F of the lower large substrate assembly 50 as shown in FIG. 16 and FIG. 19(A).

The upper large substrate assembly 60 has a transparent substrate 121 as its base material, as shown in FIGS. 17 and 18. On the surface 120F of the transparent substrate 121 facing the lower large substrate assembly 50 (see FIG. 19(B)), color filters 62, a flattening layer 63, and transparent electrodes 52 are formed in this order, and an oriented film 64 is also formed and rubbed. On the surface 120F of the upper large substrate assembly 60, the second seal members 30B, containing the second spacers 31B with a particle size d1 of approximately 9.0 μm, as well as a plurality of dummy seals 35 formed from the same sealing material as the second seal members 30B, are formed as shown in FIG. 16 and FIG. 19(B).

As shown in FIG. 19(A) and FIG. 19(B), the lower and upper large substrate assemblies 50, 60 are bonded together with the seals 30 and dummy seals 35 between them to form the large liquid crystal cell 101 (step of bonding substrates face to face). The dummy seals 35 are provided to make the density of seal members formed from the second sealing material used in the second seal members 30B along the outer edges of the large substrate equal to the density of the seal members formed from the sealing material used in the second seal members 30B in other areas when the lower and upper large substrate assemblies 50, 60 are bonded together. The dummy seals 35 keep the pressure applied to the peripheral parts of the large substrate equal to the pressure applied to the center of the large substrate when the lower and upper large substrates 50, 60 are bonded together. Accordingly, the gap becomes uniform in the peripheral parts of the display area Z of the liquid crystal panel P shown in FIG. 11, thereby more effectively preventing the occurrence of luminance unevenness and improving the display quality.

FOURTH EXAMPLE

In the fourth example, which relates to a liquid crystal panel for a monochrome display, a larger number of liquid crystal cells or liquid crystal panels can be cut from the large liquid crystal cell than in the third example. The fourth example will now be described with reference to FIGS. 20 to 24. Structures and members identical to those in the third example will be denoted by the same reference characters and will not be further referred to.

Figure 20A:
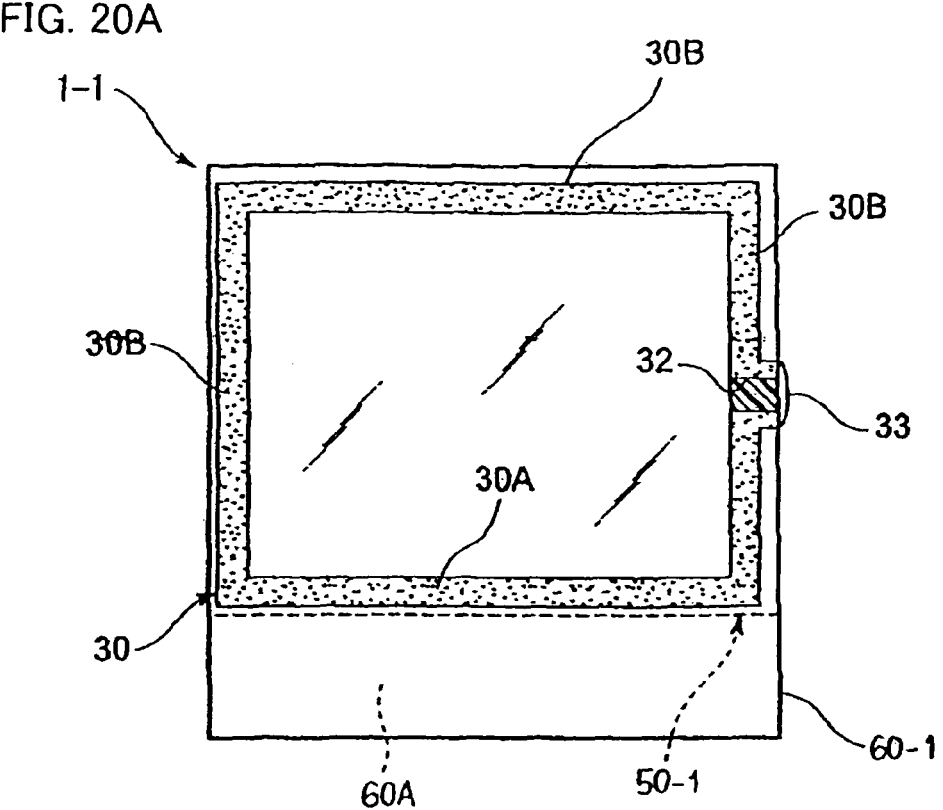
FIG. 20(A) is a transparent plan view of a single liquid crystal panel cut from the large substrate in a fourth example according to the second embodiment of the present invention, in which the liquid crystal panel includes upper and lower substrates, and the upper substrate has an extension protruding beyond the associated end of the lower substrate.
Figure 20B:
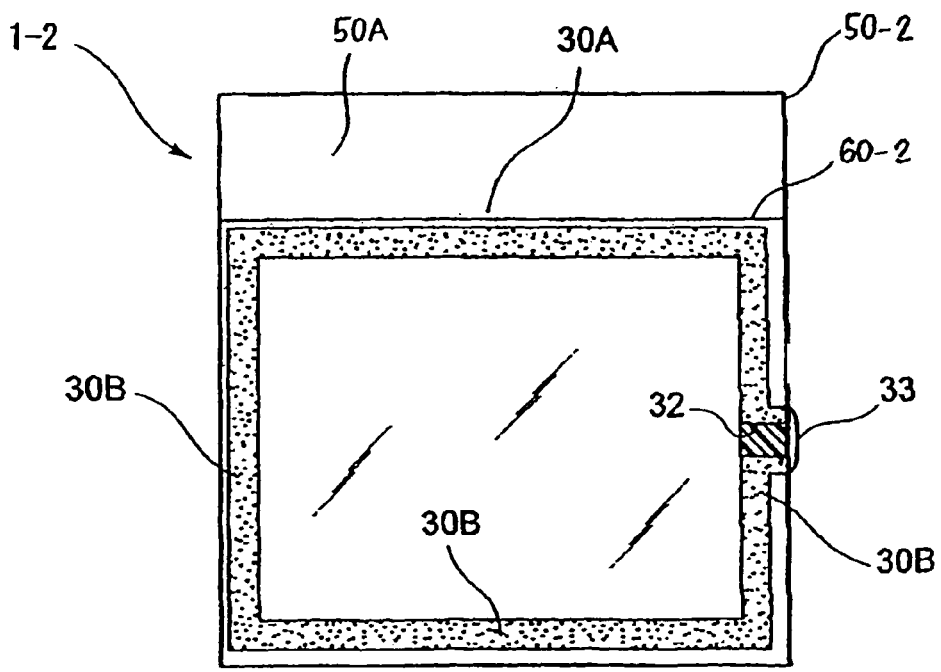
FIG. 20(B) is a transparent plan view of a single liquid crystal panel cut from the large substrate in the fourth example according to the second embodiment of the present invention, the liquid crystal panel including upper and lower substrates, the lower substrate having an extension protruding beyond the associated end of the upper substrate.

The liquid crystal panels include a first liquid crystal panel 1-1 shown in FIG. 20(A) and a second liquid crystal panel 1-2 shown in FIG. 20(B). The first liquid crystal panel 1-1 has a lower substrate 50-1 and an upper substrate 60-1; the second liquid crystal panel 1-2 has a lower substrate 50-2 and an upper substrate 60-2.

An extension 60A extends from one end of the upper substrate 60-1 of the first liquid crystal panel 1-1, while an extension 50A extends from one end of the lower substrate 50-2 of the second liquid crystal panel 1-2. The extension 60A of the upper substrate 60-1 of the first liquid crystal panel 1-1 protrudes over the extension 50A of the lower substrate 50-2 of the second liquid crystal panel 1-2, the upper and lower substrates 60-1, 50-2 being spaced apart horizontally.

The structure of the first liquid crystal panel 1-1 will now be described with reference to FIG. 20(A).

The lower substrate 50-1 in the first liquid crystal panel 1-1 has transparent electrodes 52 formed, by patterning, on the surface facing the upper substrate 60-1. An insulating film 53 is disposed on the transparent electrodes 52. A rubbed oriented film 54 is disposed on the upper surface of the insulating film 53. The upper substrate 60-1 in the first liquid crystal panel 1-1 has transparent electrodes 64 on the surface facing the lower substrate 50-1. An insulating film 67 is disposed on the transparent electrodes 64. The insulating film 67 may be omitted, because of the insulating film 53 provided on the lower substrate 50-1. A rubbed oriented film 65 is disposed on the insulating film 67.

In the fourth example, which relates to a monochrome display instead of the color display described above, no color filter is disposed on the upper substrate 60-1. Spacers 71 are disposed in the liquid crystal layer 70 to maintain a uniform gap.

The structure of the second liquid crystal panel 1-2 will now be described with reference to FIG. 20(B).

The lower substrate 50-2 in the second liquid crystal panel 1-2 has transparent electrodes 52 formed, by patterning, on the surface facing the upper substrate 60-2. An insulating film 53 is disposed on the transparent electrodes 52. A rubbed oriented film 54 is disposed on the upper surface of the insulating film 53. The upper substrate 60-2 in the second liquid crystal panel 1-2 has transparent electrodes 64 on the surface facing the lower substrate 50-2. An insulating film 67 is disposed on the transparent electrodes 64. The insulating film 67 may be omitted, because of the insulating film 53 provided on the lower substrate 50-2. A rubbed oriented film 65 is disposed on the upper surface of the insulating film 67.

In the fourth example, which relates to a monochrome display instead of the color display described above, there is no color filter on the upper substrate 60-2. Spacers 71 are disposed in the liquid crystal layer 70 to maintain a uniform gap.

The lower and upper substrates 50-1, 60-1, constituting the first liquid crystal panel 1-1 in FIG. 20(A), are bonded together with seals 30 interposed between them. The rectangular frame-shaped seal 30 disposed in the first liquid crystal panel 1-1 includes a first seal member 30A neighboring the extension 20A, and three second seal members 30B.

Figure 21:
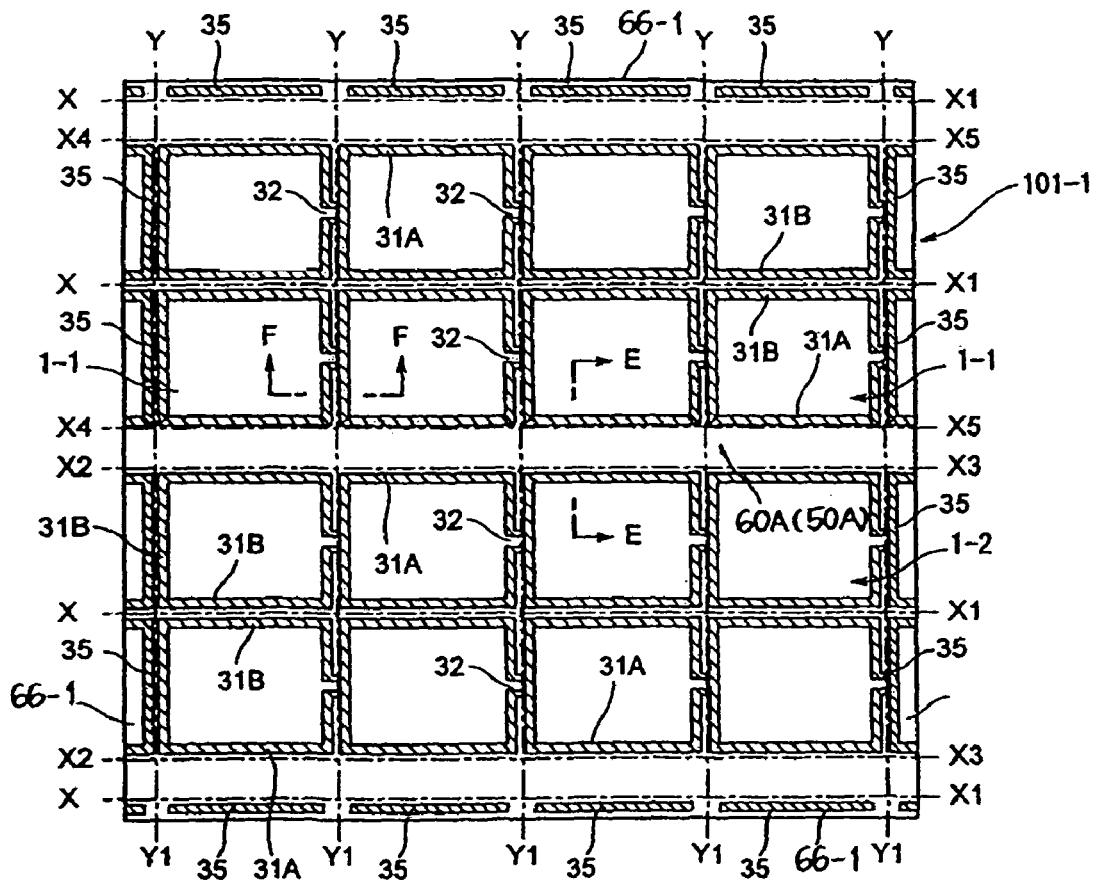
FIG. 21 is a plan view of a large liquid crystal cell from which the liquid crystal panels shown in FIG. 20(A) and FIG. 20(B) can be obtained.

An injection port 32 is provided in either one of the two seal members meeting the first seal member 30A at a right angle (see FIG. 21). A liquid crystal is injected through the injection port 32 and the injection port 32 is then sealed by port sealing resin 33 to form a liquid crystal layer 70. Spacers 71 are disposed in the liquid crystal layer 70 to maintain a uniform gap. In this embodiment, the liquid crystal injection port 32 is located in the seal member on one of the lateral edges of the liquid crystal panel 1-1.

The lower and upper substrates 50-2, 60-2 constituting the second liquid crystal panel 1-2 in FIG. 20(B) are bonded together with the seal 30 interposed between them. The rectangular frame-shaped seal 30 disposed in the second liquid crystal panel 1-2 includes a first seal member 30A neighboring the extension 50A, and three second seal members 30B.

An injection port 32 is provided in either one of the two seal members meeting the first seal member 30A at a right angle. A liquid crystal is injected through the injection port 32 and the injection port 32 is then sealed by port sealing resin 33 to form a liquid crystal layer 70.

Figure 22:
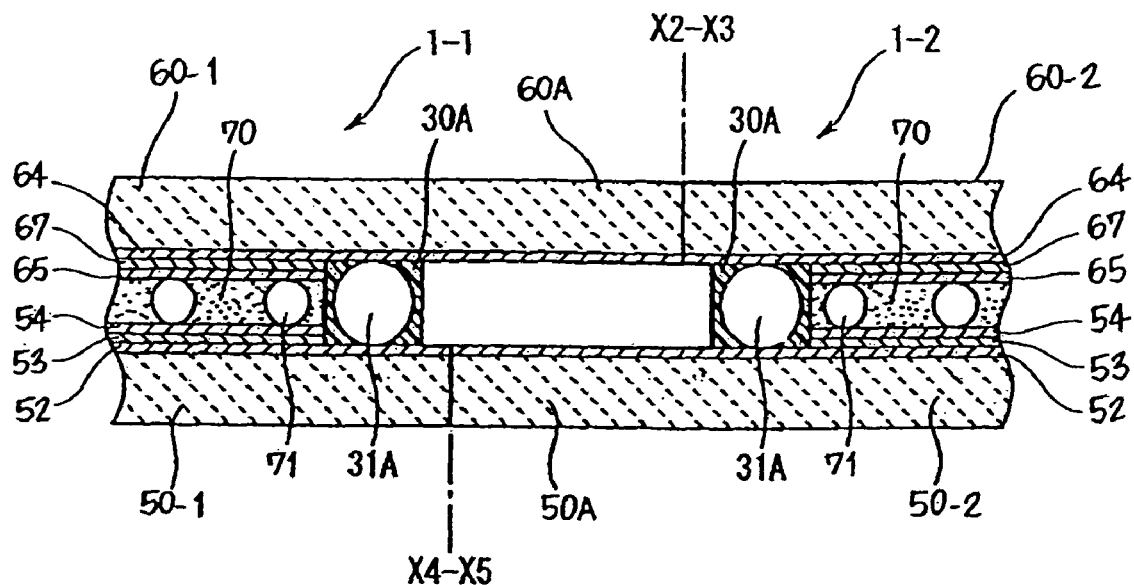
FIG. 22 is a cross-sectional view showing essential components of the large liquid crystal cell shown in FIG. 21 taken along line E-E.

FIG. 22 is a cross-sectional view of two vertically adjacent liquid crystal panels (first and second liquid crystal panels 1-1, 1-2) cut from the large liquid crystal cell 101-1 shown in FIG. 21, taken along a line near the extensions 50A, 60A. As can be seen from this figure, the extension 60A (to the left of cutting line X2-X3) of the upper substrate 60-1 of the first liquid crystal panel 1-1 is located over the extension 50A (to the right of cutting line X4-X5) of the lower substrate 50-2 of the second liquid crystal panel 1-2. The seal members neighboring the extensions 60A, 50A of the first and second liquid crystal panels 1-1, 1-2 are both first seal members 30A.

Figure 23:
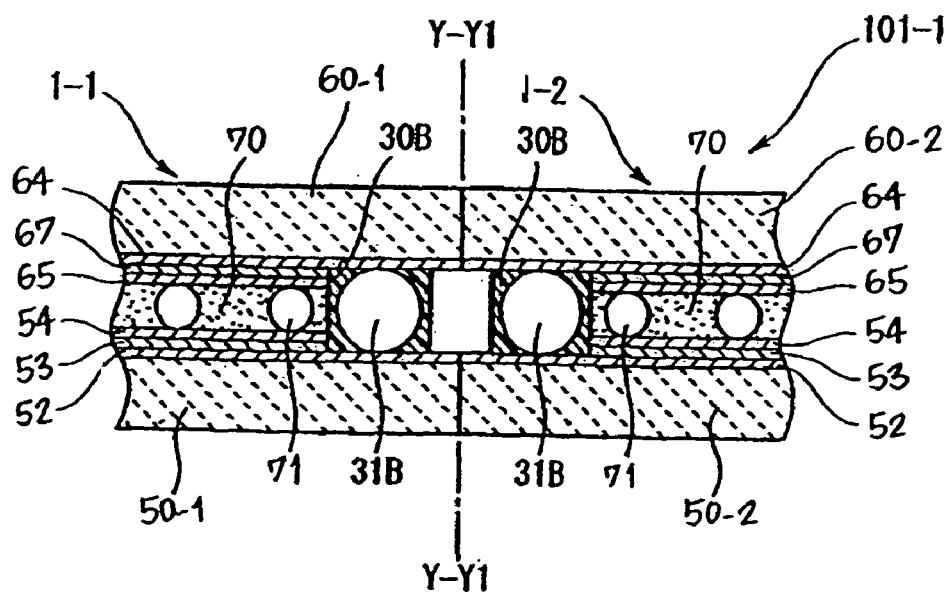
FIG. 23 is a cross-sectional view showing essential components of the large liquid crystal cell shown in FIG. 21 taken along line F-F.
Figure 24:
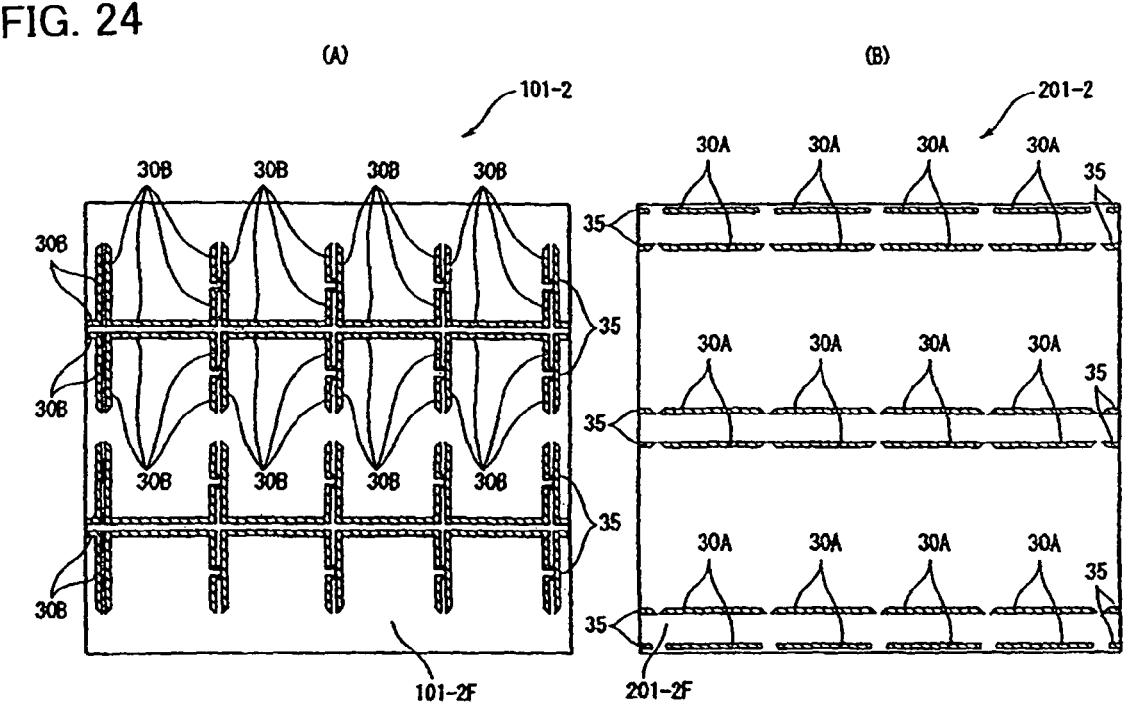
FIG. 24(A) is a plan view showing a pattern of first seal members and dummy seals on the lower large substrate in the large liquid crystal cell shown in FIG. 21.
FIG. 24(B) is a plan view showing a pattern of second seal members and dummy seals formed on the upper large substrate in the large liquid crystal cell shown in FIG. 21.

FIG. 23 is a cross-sectional view of two horizontally adjacent first liquid crystal panels 1-1 cut from the large liquid crystal cell 101-1 shown in FIG. 21, taken along a line in the area where these panels are horizontally adjacent. The upper substrate 60-1 of the liquid crystal panel 1-1 on the left is separated along cutting line Y-Y1 from the upper substrate 60-2 of the liquid crystal panel 1-1 on the right; the lower substrate 50-1 of the liquid crystal panel 1-1 on the left is separated along the same cutting line Y-Y1 from the lower substrate 50-2 of the liquid crystal panel 1-1 on the right. Since the edges of the first and second liquid crystal panels 1-1, 1-2 closely approach each other (with no extension interposed between them) along cutting line Y-Y1, the seal members adjacent to these edges are second seal members 30B.

The first and second liquid crystal panels 1-1, 1-2 having the above structures are produced as follows.

The lower and upper substrates constituting the large liquid crystal cell 101-1 are bonded together with the electrodes provided thereon facing each other. After the substrates are bonded together, the lower and upper substrates constituting the large liquid crystal cell 101-1 are cut simultaneously along cutting lines Y-Y1, as shown in FIG. 21, using a laser, scribing, or breaking device (not shown). This cutting (separation) produces (rectangular) strips each including a row of liquid crystal cells.

A plurality of injection ports 32 are aligned in a row on one edge of each strip. The injection ports 32 are brought into contact with a liquid crystal reservoir to inject a liquid crystal by vacuum injection into all the cells in the strip at once. This completes the step of injecting a liquid crystal. After the liquid crystal is injected, the injection ports 32 are sealed with port sealing resin 33 in a step of sealing the liquid crystal injection ports.

To obtain individual liquid crystal panels (liquid crystal cells filled with the liquid crystal) from the strip, each strip extending parallel to cutting lines Y-Y1 is cut along cutting lines X-X1, X2-X3, and X4-X5, which are perpendicular to cutting lines Y-Y1, in a step of simultaneously cutting the upper and lower substrates constituting the strip in the X direction. This cutting is performed using a cutting device such as a laser cutting, scribing, breaking, or dicing device.

In this manner, a plurality of first and second liquid crystal panels 1-1, 1-2 are obtained from the large liquid crystal cell 101-1.

After the large liquid crystal cell 101-1 shown in FIG. 21 is cut and separated into a plurality of liquid crystal cells (liquid crystal cells filled with a liquid crystal, which become the first liquid crystal panels 1-1 or second liquid crystal panels 1-2), there remain extra substrate sections 66-1, 66-2 along the outer edges of the large liquid crystal cell 101-1 which do not form parts of actual liquid crystal panels. Dummy seals 35 are provided between the upper and lower substrates in extra substrate sections 66-1, as described in the third example.

The large liquid crystal cell 101-1 in FIG. 21 is composed of the lower substrate (referred to hereinafter as lower large substrate 101-2) in FIG. 24(A) and the upper substrate (referred to hereinafter as upper large substrate 201-2) in FIG. 24(B).

The second seal members 30B disposed on the surface 101-2F of the lower large substrate 101-2 in FIG. 24(A) facing the upper large substrate 201-2, contain second spacers 31B with an average particle size d of approximately 6.0 μm. The same sealing material is used for the dummy seals 35 disposed on this surface 101-2F as for the second seal members 30B.

The first seal members 30A disposed on the surface 201-2F of the upper large substrate 201-2 shown in FIG. 24(B) facing the lower large substrate 101-2 contain first spacers 31A with an average particle size d of approximately 6.5 μm. The same sealing material is used for the dummy seals 35 disposed on this surface 201-2F as for the first seal members 30A.

The seals disposed on the lower large substrate 101-2 accordingly contain spacers with a particle size different from the particle size of the spacers disposed on the upper large substrate 201-2. In the fourth example, the seals disposed on the upper large substrate contain spacers with a smaller particle size than the seals disposed on the lower large substrate.

The liquid crystal panels 1-1, 1-2 having the above structure in the fourth example, in addition to providing the same effects as in the third example, allow a larger number of liquid crystal panels to be obtained from large substrates of liquid crystal or large substrates because the extensions 20A of liquid crystal panels 1-1 and the extensions 50A of the liquid crystal panels 1-2 are formed separately, in a vertically overlapped arrangement. Accordingly, the number of extra substrate sections not actually used in the panels is dramatically reduced as compared with the case of the first embodiment. This leads to a reduction in production cost and thus in panel price.

Furthermore, the problem of luminance unevenness is solved and the display quality or panel quality is improved.

Figure 35:
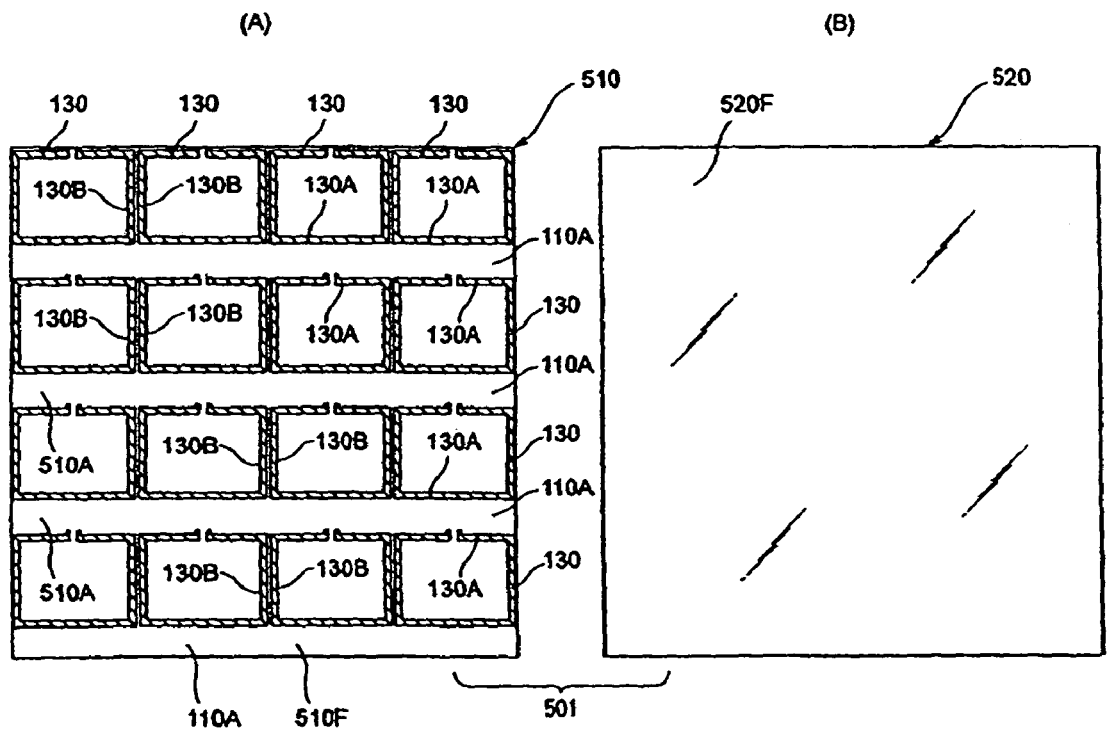
FIG. 35(A) is a plan view of a lower large substrate in the large liquid crystal cell, with seals disposed in a pattern thereon.
FIG. 35(B) is a plan view of an upper large substrate in the large liquid crystal cell, with no seals disposed thereon.

In the fourth example, since the seals are formed by printing, seal members 30A and 30B are printed separately on the upper and lower substrates. If the seals are formed by dispensing in this embodiment, however, all the seal members 30A and 30B can be formed on either one of the upper and lower substrates without the need to apply sealing material separately to the upper and lower substrates. When the seal members 30A and 30B are formed on just one of the upper and lower substrates, the seal members 30A and 30B are disposed in, for example, the pattern shown in FIG. 35(A) and FIG. 35(B). To put spacers with different particle sizes in the proper sealing areas, a scatter mask is set when the spacers are scattered. Use of such masks enables predetermined spacers to be scattered onto predetermined areas.

The oriented film, which is used for the liquid crystal cell in the fourth example, may be omitted when the present invention is applied to a PN (polymer network) liquid crystal.

Although polarizing plates are added to the completed liquid crystal panel, the polarizing plates may be omitted in a completed PN liquid crystal panel.

Although a liquid crystal is used as the electro-optical conversion member in the second embodiment, an EL (electroluminescence) element may be used instead; the same effects are obtained as in the case where a liquid crystal is used.

The second embodiment is also applicable to the following liquid crystal panels or liquid crystal devices.

The substrate may be a plastic substrate, instead of a glass substrate. The liquid crystal device is not limited to the transmissive type and may be a reflective or semi-transparent liquid crystal device. The liquid crystal device may be an active-matrix liquid crystal device using TFT, MIM, or other active elements, instead of a passive-matrix liquid crystal device. The liquid crystal device may be a static liquid crystal device, instead of a matrix-type liquid crystal device.

Although in this embodiment each seal member of the frame-shaped seal contains throughout its entire area spacers having the same particle size, some parts of a seal member may contain spacers with a particle size different from the particle size in other parts of the same seal member.

A third embodiment of the present invention will now be described with reference to FIGS. 25A, 25B, and 26.

In the first and second embodiments described above, the gap between the lower and upper large substrates is regulated with spherical spacers.

Figure 25A:
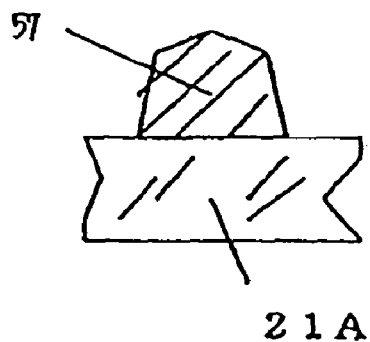
FIG. 25A shows a first embodiment of a columnar spacer placed on a large substrate.
Figure 25B:
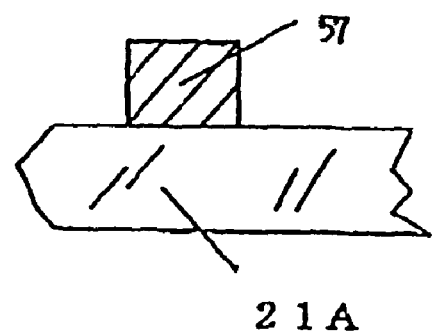
FIG. 25(B) shows a second embodiment of a columnar spacer placed on a large substrate.
Figure 26:
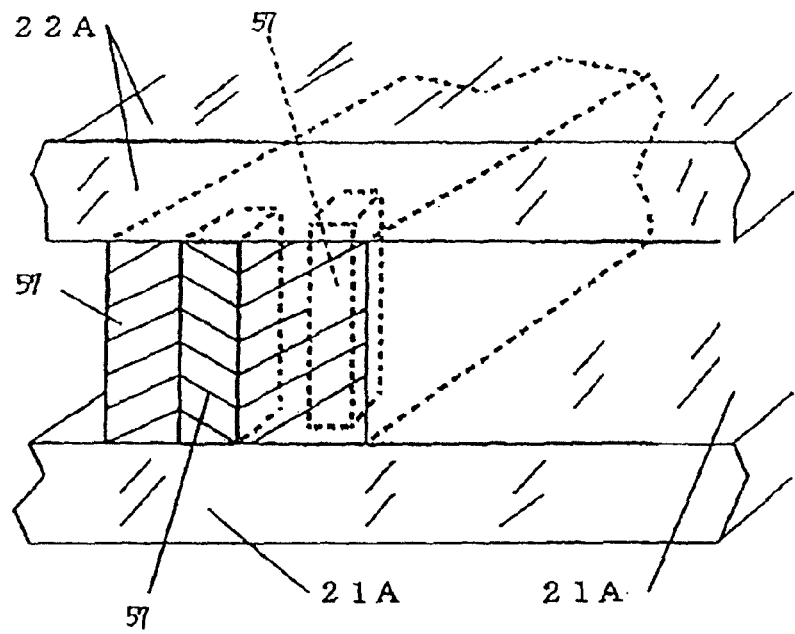
FIG. 26 shows spacers disposed between the upper and lower large substrates.
Figure 27:
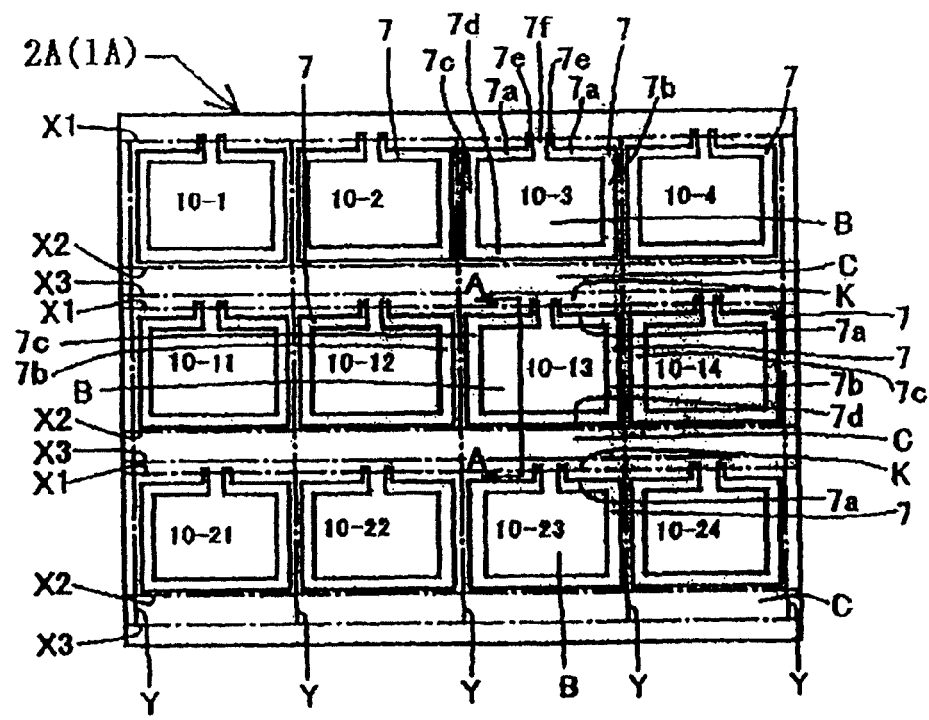
FIG. 27 is a transparent plan view showing a plurality of panels formed in a conventional large substrate.
Figure 28:
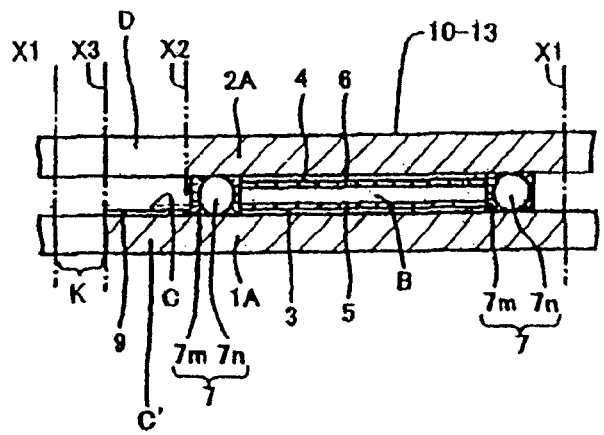
FIG. 28 is a cross-sectional view of one of the panels shown in FIG. 27 taken along line A-A.
Figure 29:
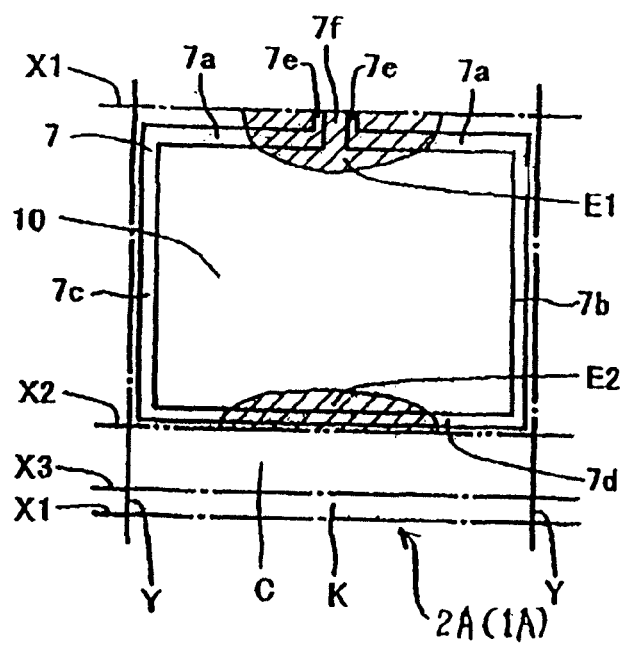
FIG. 29 is a transparent plan view showing part of the large substrate in FIG. 27 to illustrate a problem in the conventional art.
Figure 30:
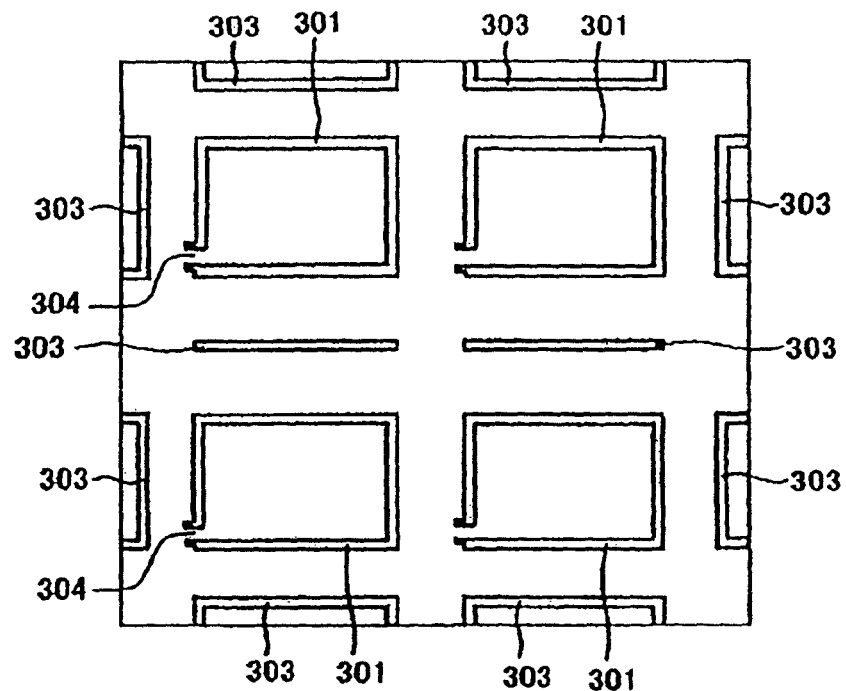
FIG. 30 shows a conventional pattern of seals disposed on the substrate.

In the third embodiment, columnar spacers having a rectangular, square, trapezoidal, or triangular cross section as shown in FIG. 25A or 25B are used as the gap adjustment members, at least in areas where the seals are placed, and insulating adhesive members are used to cover the columnar gap adjustment members.

The gap adjustment members are not limited to columnar members, so the gap adjustment members will be referred to hereinafter as fixed spacers. From the viewpoint of manufacture, however, the gap adjustment members are preferably columnar.

First, columnar spacers of fixed type are formed in the areas where the seals are to be disposed. Then, insulating adhesive resin members capable of covering the fixed spacers are also formed in the areas where the seals are to be disposed. Seals are thereby formed, with fixed spacers included therewithin. The fixed spacers may also be disposed in areas where the seals are not formed.

FIFTH EXAMPLE

In the fifth example, the gap between the lower and upper large substrates 21A, 22A (see FIG. 2) is adjusted by the height of the columnar spacers 57 as shown in FIG. 25A or 25B.

This gap can also be adjusted by controlling the density of the fixed spacers (i.e., the number of fixed spacers) in areas where the seals will be formed. The densities of fixed spacers in different areas where seals are to be formed can be compared with reference to a value obtained by multiplying the number of fixed spacers per unit area of the seal by the cross-sectional area of one fixed spacer and dividing the product by the unit area of the seal.

Other reference values that may be used to compare the density of fixed spacers in different areas where seals are formed include the number of fixed spacers per unit area in which the seals are formed, the height of the fixed spacers in the unit area in which the seals are formed (a difference in this height refers to a difference in the height of the fixed spacers before bonding), or the cross-sectional area of fixed spacers per unit area in which the seals are formed (a difference in this cross-sectional area may refer to a difference in the cross-sectional area of the fixed spacers before bonding, or a set of conditions that changes the cross-sectional area of the fixed spacers after bonding). A combination of these reference values may also be used.

The gap irregularities between the upper and lower substrates constituting a panel can be eliminated and the panel thickness be made uniform over the entire area of the panel by placing fixed spacers in at least the areas occupied by the seals according to a predetermined arrangement as described above.

The fifth example will now be described with reference to FIG. 3, which is a transparent view of a single panel 20-14 in the large substrate in FIG. 1.

The first sealing material 27-1, which contains a higher density of fixed spacers 57 (a larger number of fixed spacers per unit area of the seal area) is used to form the seal member 27d adjacent to the extension C' (on the lower large substrate 21A) for the connection electrode forming section C of panel 20-14, and the seal member 27a adjacent to the extension C' of the panel 20-4 adjacent to panel 20-14.

The second sealing material 27-2, which contains a lower density of fixed spacers 57 per unit area (the second sealing material 27-2 contains fewer fixed spacers per unit area than the first sealing material 27-1) is used to form seal members 27b and 27c.

By placing the fixed spacers in this manner, for the same reason as discussed in the first embodiment, it is possible to prevent irregularities in the gap between the upper and lower substrates in different parts of the panel. More specifically, since seal member 27a is relatively distant from seal member 27d of the panel adjacent to seal member 27a, these seal members are subject to relatively high pressure when the upper and lower substrates are bonded together under pressure; the first sealing material, which contains a higher density of fixed spacers and/or taller fixed spacers and/or fixed spacers having a larger cross-sectional area, is therefore used for these seal members 27a and 27d to make them more resistant to the externally applied pressure.

This solves the problem of gap irregularities in different areas of the panel, which occurs if seal members 27a and 27d flatten more than the other seal members (27b and 27c) in the same panel, making the corresponding gaps narrower than the gaps at seal members 27b and 27c.

The liquid crystal panel in the fifth example according to the present invention is characterized in that substrates are bonded face to face with a frame-shaped seal containing gap adjustment members interposed therebetween, at least one of the substrates has at least one outer edge that extends beyond the associated outer edge of the other substrate, a liquid crystal is encapsulated inside the frame-shaped seal, and the seal member adjacent to the extending edge contains more fixed spacers than another seal member. The basic structures by which these features are obtained can be systematically summarized as follows.

1-1. The density of spacers is changed in different seal areas.

1-1-1. The number of spherical spacers per unit area of the seal is changed.

1-1-1-1. The spacers are spherical and have the same diameter. The spherical spacers are elastic or flexible.

1-1-1-2. The spacers are spherical and have different diameters. The spherical spacers are elastic or flexible.

1-2. The density of fixed spacers is changed in different seal areas.

1-2-1. The density of fixed spacers is changed in different seal areas by changing the number of fixed spacers per unit area of the seal.

1-2-1-1. The number of spacers is changed as in 1-2-1 above, using fixed spacers with the same cross-sectional area parallel to the substrate surface before the substrates are bonded face to face.

1-2-1-2. The number of spacers is changed as in 1-2-1 above, using fixed spacers with different cross-sectional areas parallel to the substrate surface before the substrates are bonded face to face.

1-2-1-3. The number of spacers is changed as in 1-2-1 above, using fixed spacers with the same cross-sectional area parallel to the substrate surface after the substrates are bonded face to face.

1-2-1-4. The number of spacers is changed as in 1-2-1 above, using fixed spacers with different cross-sectional areas parallel to the substrate surface after the substrates are bonded face to face.

1-2-2. The total cross-sectional area (cross-sectional area parallel to the substrate) of the fixed spacers disposed per unit area of the seal, the a real density, is changed so that the arrangement density of the fixed spacers in the seal area is changed.

1-2-2-1. The fixed spacers used in 1-2-2 above have generally (or substantially) identical cross-sectional areas parallel to the substrate surface before the substrates are bonded face to face. The cross-sectional area before or after the substrates are bonded face to face may be used as the cross-sectional area of the fixed spacers; the cross-sectional area to be used may be determined experimentally. To reduce the cost of manufacture, it is preferable to use spacers having generally (or substantially) identical cross-sectional areas parallel to the substrate surface before the substrates are bonded face to face.

1-2-2-2. The fixed spacers used in 1-2-2 above have different (or substantially different) cross-sectional areas parallel to the substrate surface before the substrates are bonded face to face. The cross-sectional area before or after the substrates are bonded face to face may be used as the cross-sectional area of the fixed spacers; the cross-sectional area to be used may be determined experimentally. To reduce the cost of manufacture, it is preferable to use spacers having different (or substantially different) cross-sectional areas parallel to the substrate space before the substrates are bonded face to face.

Figure 4:
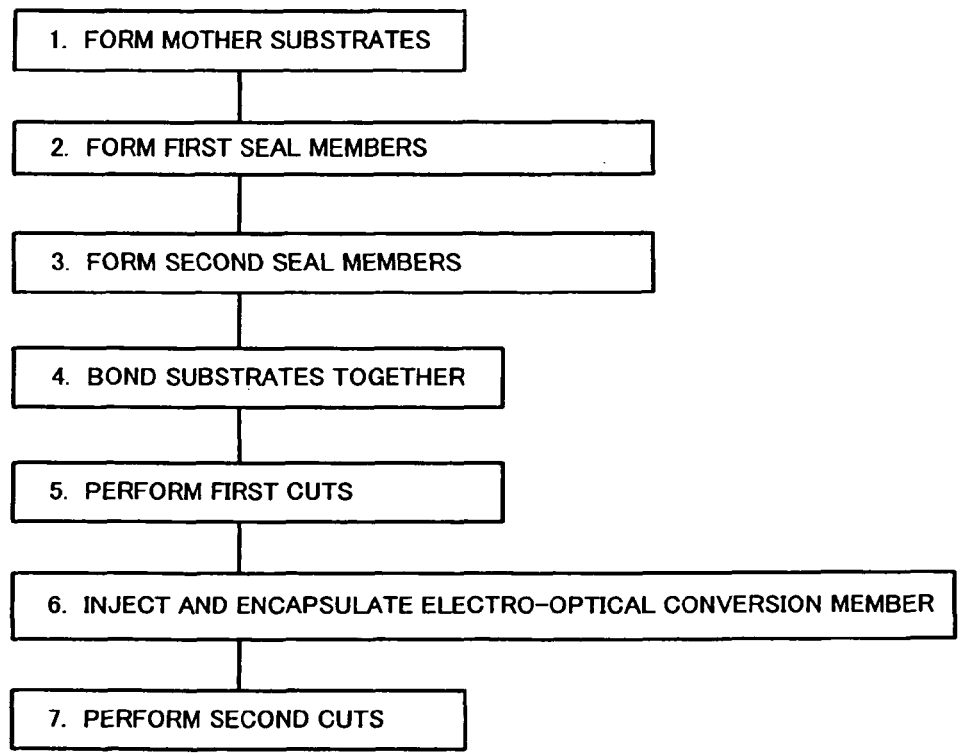
FIG. 4 is a flowchart illustrating the steps of producing a plurality of panels from the large substrate (mother substrate) in FIG. 1.

The panel according to the third embodiment in the fifth example can be produced by a method similar to the panel described in the first embodiment with reference to the FIG. 4.

In the fifth example, as in the first and second embodiments, the first seal material (containing a relatively large number or high density of fixed spacers per unit area of the seal area) and the second sealing material (containing a relatively small number or low density of fixed spacers disposed per unit area of the seal area) can both be deposited at the same time on the same one of the upper and lower large substrates constituting the large substrate, resulting in reduced production cost.

SIXTH EXAMPLE

In the sixth example, the gap adjustment members are fixed spacers.

If adjacent seal members of the first and second liquid crystal panels 1-1, 1-2 are distant from each other as in FIG. 22, these seal members are formed from a first sealing material, which contains fixed spacers having a large cross-sectional area. If adjacent seal members of the first and second liquid crystal panels 1-1, 1-2 are close to each other as in FIG. 23, these seal members are formed from a second sealing material, which contains fixed spacers having a small cross-sectional area.

When adjacent seal members are relatively distant from each other as in FIG. 22, the seal members are subject to relatively high external pressure during pressure bonding.

In the sixth example, however, these seal members contain fixed spacers having relatively large cross-sectional areas and accordingly are highly resistant to flattening.

Accordingly, the amount of flattening of these seal members is substantially equal to the amount of flattening of seal members that are close to each other and contain fixed spacers having relatively small cross-sectional areas as in FIG. 23. As a result, individual panels are produced with a uniform panel thickness.

In the sixth example, a large substrate can be produced by forming first seal members (disposed in predetermined seal areas and containing fixed spacers 57 having a relatively large cross-sectional area) and second seal members (disposed in predetermined seal areas and containing fixed spacers 57 having a relatively small cross-sectional area) simultaneously on one of the upper and lower large substrates constituting the large substrate, resulting in reduced production cost.

Individual liquid crystal panels can be produced from a large substrate including upper and lower large substrates, on one of which the first seal members (containing fixed spacers 57 having a relatively large cross-sectional area) are disposed and on the other one of which the second seal members (containing fixed spacers 57 having a relatively small cross-sectional area) are disposed, leading to a reduction in production cost.

Next, a method of manufacturing the fixed spacers will be described.

(1) An active matrix substrate is formed by forming a matrix of switching elements such as thin-film transistors (TFT) and gate electrodes, source electrodes, and pixel electrodes wired to the switching elements on a lower large substrate (lower mother substrate) 21A (see FIG. 2) having a plurality of panel elements, each panel element corresponding to one panel.

(2) A photosensitive resin for creating fixed spacers is applied by spin coating onto the active matrix substrate. A positive acrylic resin, a polyimide-based photosensitive resin, or some other type of photosensitive resin may be used. The fixed spacers are formed in areas where seals are to be formed, outside the display area. The fixed spacers may also be formed in the display area.

(3) A pattern exposure process is performed with an ultraviolet light using a mask pattern.

(4) Unnecessary resin is removed using a developer and the active matrix substrate is heated to cure the fixed spacers 57 formed from the resin.

The fixed spacers 57 can be produced with a single exposure, because the height of the fixed spacers and the size of their cross-sectional area (the width of the fixed spacers) can be adjusted by the amount of photosensitive resin applied, the thickness of the photosensitive resin film, and the sizes and shapes of openings in the mask pattern in steps (1) to (4) above. Furthermore, fixed spacers in various shapes can be produced at the same time, so the problems of gap irregularities between the upper and lower substrates, unevenness of the liquid crystal layer thickness, and unevenness of the seal thickness can be easily, accurately, and inexpensively solved.

Next, a polyimide-type oriented film is applied by a technique such as printing or spin-coating on the active matrix substrate having the fixed spacers 57 disposed thereon.

The oriented film is baked at 180° C. and then rubbed.

In the next step for producing liquid crystal panels, a resin sealing adhesive is applied to one of the upper and lower large substrates and the upper and lower large substrates are bonded face to face with seals interposed between them to form a large substrate.

The resultant large substrate is cut into strips each having injection ports arranged in a row along a longitudinal edge of the strip (when a single panel is obtained from the resultant large substrate, or two or three panels are obtained from the resultant large substrate, the large substrate need not be cut into strips).

A liquid crystal is injected into individual panels in the strip through the respective injection ports.

After the liquid crystal is injected, the injection ports of the panels in the strip are sealed.

The strip is then cut to obtain individual panels.

Although the fixed spacers are formed on the lower large substrate in the above description, the fixed spacers may be formed on the upper large substrate.

The curing temperature of the oriented film, the curing temperature of the photosensitive resin for the fixed spacers, and the ultraviolet irradiation time and temperature should be determined from the specifications of the materials used.

Figure 15A:
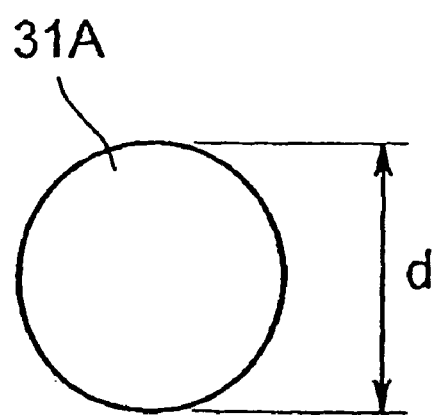
FIG. 15(A) and FIG. 15(B) illustrate the diameters of spacers mixed in side 30A of the seal shown in FIG. 14.
Figure 15B:
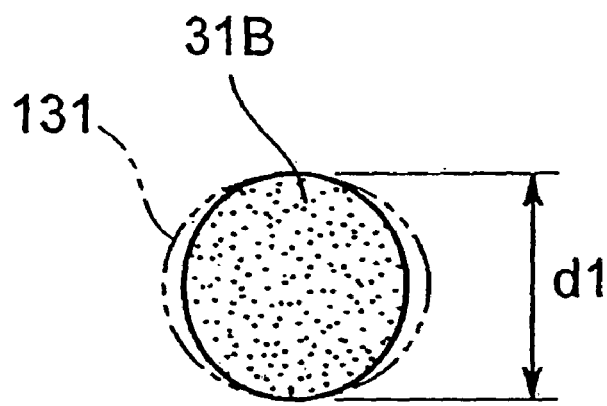

With reference to FIGS. 10 and 15, the liquid crystal panel in the fourth embodiment of the present invention can be described as follows. The liquid crystal panel has a structure similar to that shown in FIG. 10, including upper and lower substrates bonded face to face with a gap between them, the gap being defined by elastic spacers elastically deformable from the state shown in FIG. 15(A) to the state shown in FIG. 15(B) under pressure; a liquid crystal layer is encapsulated by a seal disposed in the gap; the liquid crystal panel is characterized in that the upper and lower substrates have a first end where an extension C' provided at one end of the lower substrate protrudes beyond the associated end of the upper substrate (i.e., the outer edges of the upper and lower substrates are not substantially aligned with each other, because one of the upper and lower substrates projects beyond the other substrate when the two substrates are bonded together), and a second end where the both ends of the two substrates are aligned with each other (i.e., the outer edges of the upper and lower substrates are substantially aligned with each other, because neither of the upper and lower substrates projects beyond the other substrate when the two substrates are bonded together, i.e., no extension is formed), the seal is disposed along the outer edges of one of the two substrates, the spacers are disposed in or near the area occupied by the seal, the spacers disposed near the first end form a first spacer structure, the spacers disposed near the second end form a second spacer structure, and the first spacer structure is more resistant than the second spacer structure to pressure applied to the two substrates, making the gap resistant to compression.

What is claimed is:

1. A method of manufacturing a liquid crystal panel, comprising at least the steps of:
    forming mother substrates by separately forming a first substrate and a second substrate;
    forming seal members;
    bonding said first and second substrates together face to face with frame-shaped seals formed from the seal members interposed therebetween to frame a plurality of regions corresponding to individual panels;

injecting and encapsulating a liquid crystal as an electro-optical conversion member inside said seals; and
cutting the bonded first and second substrates;
wherein, if a side of the frame formed by the seal in one panel is distant from a side of the frame formed by the seal in an adjacent panel so that these two seals are widely spaced, the seal members constituting these sides are formed into first structure from a sealing material containing gap adjustment members;
wherein, if a side of the frame formed by the seal in one panel is close to a side of the frame formed by the seal in an adjacent panel when said first and second substrates are bonded in said step of bonding, the seal members constituting these sides are formed into second structure from a material containing gap adjustment members; and
wherein said first structure is more resistant to pressure applied to said two substrates than said second structure, whereby said first and second structures make said gap resistant to compression.

2. The method of manufacturing a liquid crystal panel according to claim 1, wherein said sealing material in said first structure contains a relatively high proportion of said gap adjustment members, and said sealing material in said second structure contains a relatively low proportion of said gap adjustment members.

3. The method of manufacturing a liquid crystal panel according to claim 2, wherein said gap adjustment members are spherical, cylindrical or prismatic.

4. The method of manufacturing a liquid crystal panel according to claim 1, wherein said sealing material in said first structure contains spherical or cylindrical spacers having a relatively large diameter as the gap adjustment members, and said sealing material in said second structure contains spherical or cylindrical spacers having a relatively small diameter as the gap adjustment members.

5. The method of manufacturing a liquid crystal panel according to claim 1, wherein said sealing material in said first structure contains cylindrical or prismatic spacers as the gap adjustment members having a relatively large cross-sectional area parallel to the surface of liquid crystal panel, and said sealing material in said second structure contains cylindrical or prismatic spacers as the gap adjustment members having a relatively small cross-sectional area parallel to the surface of liquid crystal panel.

6. The method of manufacturing a liquid crystal panel according to claim 1, further comprising the step of providing a dummy seal outside a seal closest to a peripheral part of said first and/or second substrate, at a distance from said seal equal to a distance between two adjacent seals in another area.

7. The method of manufacturing a liquid crystal panel according to claim 1, wherein said first or said second substrate has an extension for a connection electrode, the extension extending outward from one frame formed by the seal, and the two seal members disposed on both sides of the extension are said first structure.

8. A large substrate for producing a plurality of panels, the large substrate being formed by bonding first and second substrates together with seals interposed therebetween to form a plurality of regions corresponding to individual panels;
wherein said seals are frame-shaped, each seal framing one panel, and if a side of the frame formed by the seal in one panel is distant from a side of the frame formed by the seal in an adjacent panel, so that the two seals are widely spaced, the mutually adjacent sides of the widely spaced seals are formed into first structure from a sealing material containing gap adjustment members, and if a side of the frame formed by the seal in one panel is close to a side of the frame formed by the seal in an adjacent panel, so that the seals are narrowly spaced, the mutually adjacent sides of the narrowly spaced seals are formed into second structure from a sealing material containing a relatively low proportion of gap adjustment members, and
wherein said first structure is more resistant to pressure applied to said two substrates than said second structure, whereby said first and second structures make said gap resistant to compression.

9. The large substrate for producing a plurality of panels according to claim 8, wherein said gap adjustment members are spherical, cylindrical or prismatic.

10. The large substrate for producing a plurality of panels according to claim 8, wherein said sealing material in said first structure contains spherical spacers having relatively large diameters as the gap adjustment members, and said sealing material in said second structure contains spherical spacers having relatively small diameters as the gap adjustment members.

11. The large substrate for producing a plurality of panels according to claim 8, wherein said sealing material in said first structure contains cylindrical or prismatic spacers as the gap adjustment members having a relatively large cross-sectional area parallel to a liquid crystal panel surface, and said sealing material in said second structure contains cylindrical or prismatic spacers as the gap adjustment members having a relatively small cross-sectional area parallel to the liquid crystal panel surface.

12. The large substrate for producing a plurality of panels according to claim 8, wherein a dummy seal is provided outside a seal closest to a peripheral part of said first and/or second substrate, at a distance from said seal equal to a distance between two adjacent seals in another area.

13. The large substrate for producing a plurality of panels according to claim 8, wherein said first or said second substrate has an extension for a connection electrode, the extension extending outward from one frame formed by the seal, and the two seal members disposed on both sides of the extension are said first structure.

14. A liquid crystal panel having two substrates bonded face to face with a frame-shaped seal interposed therebetween, the seal containing gap adjustment members, one of the substrates having at least at one end thereof an extension protruding beyond the associated end of the other substrate, a liquid crystal being encapsulated inside the seal,
wherein a side of the seal neighboring the extension is formed into a first structure from a sealing material containing gap adjustment members, and a side of the seal not neighboring the extension is formed into a second structure from a sealing material containing gap adjustment members,
wherein said first structure is more resistant to pressure applied to said two substrates than said second structure, whereby said first and second structures make said gap resistant to compression, and
wherein said sealing material in said first structure contains a relatively high proportion or density of said gap adjustment members, and said sealing material in said second structure contains a relatively low proportion or density of said gap adjustment members.

15. The liquid crystal panel according to claim 14, wherein said gap adjustment members are spherical, cylindrical or prismatic.

16. A liquid crystal panel having two substrates bonded face to face with a frame-shaped seal interposed therebetween, the seal containing gap adjustment members, one of the substrates having at least at one end thereof an extension protruding beyond the associated end of the other substrate, a liquid crystal being encapsulated inside the seal, wherein a side of the seal neighboring the extension is formed into a first structure from a sealing material containing gap adjustment members, and a side of the seal not neighboring the extension is formed into a second structure from a sealing material containing gap adjustment members, wherein said first structure is more resistant to pressure applied to said two substrates than said second structure, whereby said first and second structures make said gap resistant to compression, and wherein said sealing material in said first structure contains spherical or cylindrical spacers having a relatively large diameter as the gap adjustment members, and said sealing material in said second structure contains spherical or cylindrical spacers having a relatively small diameter as the gap adjustment members.

17. A liquid crystal panel having two substrates bonded face to face with a frame-shaped seal interposed therebetween, the seal containing gap adjustment members, one of the substrates having at least at one end thereof an extension protruding beyond the associated end of the other substrate, a liquid crystal being encapsulated inside the seal, wherein a side of the seal neighboring the extension is formed into a first structure from a sealing material containing gap adjustment members, and a side of the seal not neighboring the extension is formed into a second structure from a sealing material containing gap adjustment members, wherein said first structure is more resistant to pressure applied to said two substrates than said second structure, whereby said first and second structures make said gap resistant to compression, and wherein said sealing material in said first structure contains cylindrical or prismatic spacers as the gap adjustment members having a relatively large cross-sectional area parallel to a liquid crystal panel surface, and said sealing material in said second structure contains cylindrical or prismatic spacers as the gap adjustment members having a relatively small cross-sectional area parallel to the liquid crystal panel surface.

18. A liquid crystal panel having two substrates bonded face to face with a frame-shaped seal interposed therebetween, the seal containing gap adjustment members, one of the substrates having at least at one end thereof an extension protruding beyond the associated end of the other substrate, a liquid crystal being encapsulated inside the seal, wherein a side of the seal neighboring the extension is formed into a first structure from a sealing material containing gap adjustment members, and a side of the seal not neighboring the extension is formed into a second structure from a sealing material containing gap adjustment members, and wherein said first structure is more resistant to pressure applied to said two substrates than said second structure, whereby said first and second structures make said gap resistant to compression, said liquid crystal panel further comprising a first end where one of the two substrates protrudes beyond the other substrate, and a second end where the ends of the two substrates are vertically aligned with each other;

wherein said seal is disposed along the outer edge of one of said two substrates;

wherein spacers are disposed in or near said seal; and wherein a side of the seal neighboring the first end is formed into said first structure from a sealing material containing gap adjustment members, and sides of the seal neighboring the second end are formed into second structure from a sealing material containing gap adjustment members.

* * * * *